United States Patent
Cheng et al.

(10) Patent No.: US 9,635,576 B2
(45) Date of Patent: Apr. 25, 2017

(54) METHOD FOR TRANSMITTING CHANNEL STATE INFORMATION, USER EQUIPMENT, AND BASE STATION

(71) Applicant: HUAWEI TECHNOLOGIES CO., LTD., Shenzhen (CN)

(72) Inventors: Yan Cheng, Beijing (CN); Yongxia Lv, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 14/177,490

(22) Filed: Feb. 11, 2014

(65) Prior Publication Data

US 2014/0169204 A1 Jun. 19, 2014

Related U.S. Application Data

(63) Continuation of application No. PCT/CN2012/079894, filed on Aug. 9, 2012.

(30) Foreign Application Priority Data

Aug. 15, 2011 (CN) .......................... 2011 1 0233313

(51) Int. Cl.
  *H04W 24/10* (2009.01)
  *H04L 1/00* (2006.01)
  *H04L 1/16* (2006.01)

(52) U.S. Cl.
  CPC .......... *H04W 24/10* (2013.01); *H04L 1/0026* (2013.01); *H04L 1/0027* (2013.01); *H04L 1/0072* (2013.01); *H04L 1/1671* (2013.01)

(58) Field of Classification Search
  CPC ... H04L 1/0026; H04L 1/0027; H04L 1/0072; H04L 1/1671; H04W 24/00; H04W 24/10; H04W 72/085; H04W 72/1231
  See application file for complete search history.

(56) References Cited

U.S. PATENT DOCUMENTS

2007/0109956 A1* 5/2007 Kwon .................. H04L 1/0003
                                                            370/208
2011/0299484 A1* 12/2011 Nam et al. .................... 370/329
(Continued)

FOREIGN PATENT DOCUMENTS

CN         101834658 A    9/2010
CN         102075293 A    5/2011
(Continued)

OTHER PUBLICATIONS

Extended European Search Report issued on May 26, 2014 in corresponding European Application No. 12 823 754.2.

(Continued)

*Primary Examiner* — Khoa Huynh
(74) *Attorney, Agent, or Firm* — Staas & Halsey LLP

(57) ABSTRACT

The present invention discloses a method for transmitting channel state information, a user equipment, and a base station. The method includes: determining to-be-reported channel state information CSI, where the to-be-reported CSI includes at least one CSI report, and each CSI report of the at least one CSI report corresponds to one downlink carrier; and sending the to-be-reported CSI to a base station through a physical uplink channel. The user equipment includes a determining module and a sending module. The base station includes a receiving module, a first determining module, and a second determining module. According to the method, the user equipment, and the base station in the embodiments of the present invention, channel state information from different downlink carriers can be transmitted on a same subframe, and a performance requirement of the reported channel state information can be ensured, and power utilization efficiency can be improved.

9 Claims, 4 Drawing Sheets

(56) References Cited

U.S. PATENT DOCUMENTS

| | | | | |
|---|---|---|---|---|
| 2012/0039252 | A1* | 2/2012 | Damnjanovic | H04L 1/0026 370/328 |
| 2012/0140649 | A1* | 6/2012 | Choudhury | H04W 24/10 370/252 |

FOREIGN PATENT DOCUMENTS

| | | |
|---|---|---|
| CN | 102123015 | 7/2011 |
| CN | 101908951 | 12/2012 |
| EP | 2 547 139 | 1/2013 |
| WO | 2011/082626 A1 | 7/2011 |
| WO | WO 2011/085230 | 7/2011 |

OTHER PUBLICATIONS

"Periodic CSI reporting for Carrier Aggregation", 3GPP Draft; R1-105888 TI Periodic CSI Reporting_R4, 3rd Generation Partnership Project (3GPP), Mobile Competence Centre; 650, Route Des Lucioles; F-06921 Sophia-Antipolis Cedex; France, vol. Ran WG1, no. Jacksonville, USA; 20101115, Nov. 9, 2010, XP050466712.

"Multiplexing periodic CSI reports on subframes with PUSCH", 3GPP Draft; R1-110067 Multiplexing Periodic CSI Reports on Subframes With PUSCH, 3rd Generation Partnership Project (3GPP), Mobile Compentence Centre; 650, Route Des Lucioles; F-06921 Sophi-Antpolis Cedex; France, vol. Ran WG1, no. Dublin, Ireland; 20110117-20110121, Jan. 31, 2011, XP050598999.

International Search Report issued Nov. 29, 2012, in corresponding International Patent Application No. PCT/CN2012/079894.

International Search Report mailed Nov. 29, 2012 in corresponding International Patent Application No. PCT/CN2012/079894.

Chinese Office Action dated Nov. 14, 2014 in corresponding Chinese Patent Application No. 201110233313.8.

Chinese Search Report dated Oct. 28, 2014 in corresponding Chinese Patent Application No. 2011102333138.

* cited by examiner

METHOD FOR TRANSMITTING CHANNEL STATE INFORMATION, USER EQUIPMENT, AND BASE STATION

CROSS-REFERENCE TO RELATED APPLICATION

This application is a continuation of International Application No. PCT/CN2012/079894, filed on Aug. 9, 2012, which claims priority to Chinese Patent Application No. 201110233313.8, filed on Aug. 15, 2011, both of which are hereby incorporated by reference in their entireties.

TECHNICAL FIELD

The present invention relates to the communications field, and in particular, to a method for transmitting channel state information, a user equipment, and a base station in the communications field.

BACKGROUND

Long Term Evolution-Advanced (Long Term Evolution-Advanced, "LTE-A" for short) is a further evolved and enhanced 3rd Generation Partnership Project (3rd Generation Partnership Project, "3GPP" for short) LTE system. To meet the requirement of the International Telecommunication Union on the peak data rate of 4th generation communications technologies, the carrier aggregation (Carrier Aggregation, "CA" for short) technology, also called the spectrum aggregation (Spectrum Aggregation) technology or the bandwidth extension (Bandwidth Extension) technology, is introduced into the LTE-A system. In the carrier aggregation technology, spectrums of two or more component carriers (Component Carrier, "CC" for short) are aggregated to obtain a wider transmission bandwidth, the spectrums of the component carriers may be adjacent consecutive spectrums, or non-adjacent spectrums at a same frequency band, or even nonconsecutive spectrums at different frequency bands. In an LTE Release 8 or 9 (Release 8 or 9, "Rel-8/9" for short) system, a user equipment (User Equipment, "UE" for short) is only capable of accessing one of the component carriers to receive and transmit data; however, in the LTE-A system, a user equipment can simultaneously access multiple component carriers to receive and transmit data according to its capability and service requirement.

To support technologies, such as dynamic scheduling and downlink multiple input multiple output (Multiple Input Multiple Output, "MIMO" for short) transmission, the user equipment needs to feed back channel state information (Channel State Information, "CSI" for short) to a base station (Evolved NodeB, "eNB" for short). Because the carrier aggregation technology is introduced into the LTE-A system, channel state information of each component carrier needs to be fed back in an uplink direction when the user equipment simultaneously accesses multiple component carriers to receive downlink data. That is, in a scenario of carrier aggregation in the LTE-A system, a case where channel state information of multiple downlink carriers needs to be transmitted on one subframe may occur.

Therefore, a technical solution is required to transmit channel state information from different downlink carriers on a same sub-frame.

SUMMARY

Embodiments of the present invention provide a method for transmitting channel state information, a user equipment, and a base station, which can transmit channel state information from different downlink carriers on a same subframe.

According to one aspect, an embodiment of the present invention provides a method for transmitting channel state information, where the method includes: determining to-be-reported channel state information CSI, where the to-be-reported CSI includes at least one CSI report, and each CSI report of the at least one CSI report corresponds to one downlink carrier; and sending the to-be-reported CSI to a base station through a physical uplink channel.

According to another aspect, an embodiment of the present invention provides a method for transmitting channel state information, where the method includes: receiving channel state information CSI that is reported by a user equipment through a physical uplink channel, where the reported CSI includes at least one CSI report, and each CSI report of the at least one CSI report corresponds to one downlink carrier; determining a downlink carrier set that corresponds to the reported CSI, where each downlink carrier in the downlink carrier set corresponds to one CSI report in the reported CSI; and determining a CSI report of each downlink carrier in the downlink carrier set according to the reported CSI and the downlink carrier set.

According to still another aspect, an embodiment of the present invention provides a user equipment, where the user equipment includes: a determining module, configured to determine to-be-reported channel state information CSI, where the to-be-reported CSI includes at least one CSI report, and each CSI report of the at least one CSI report corresponds to one downlink carrier; and a sending module, configured to send the to-be-reported CSI determined by the determining module to a base station through a physical uplink channel.

According to still another aspect, an embodiment of the present invention provides a base station, where the base station includes: a receiving module, configured to receive channel state information CSI that is reported by a user equipment through a physical uplink channel, where the reported CSI includes at least one CSI report, and each CSI report of the at least one CSI report corresponds to one downlink carrier; a first determining module, configured to determine a downlink carrier set that corresponds to the reported CSI, where each downlink carrier in the downlink carrier set corresponds to one CSI report in the reported CSI; and a second determining module, configured to determine a CSI report of each downlink carrier in the downlink carrier set according to the reported CSI and the downlink carrier set.

Base on the foregoing technical solutions and according to the method for transmitting channel state information, the user equipment, and the base station in the embodiments of the present invention, channel state information from different downlink carriers can be transmitted on a same subframe, and a performance requirement on the transmission of channel state information can be ensured and power utilization efficiency can be improved by taking into consideration factors such as reporting types of and/or the number of channel state information reports that need to be transmitted on the same subframe, a capacity of a corresponding physical uplink channel, attributes of downlink carriers, priorities of physical uplink channel resources, and the number of coding bits.

BRIEF DESCRIPTION OF DRAWINGS

To describe the technical solutions in the embodiments of the present invention more clearly, the following briefly introduces the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

Figure 1:
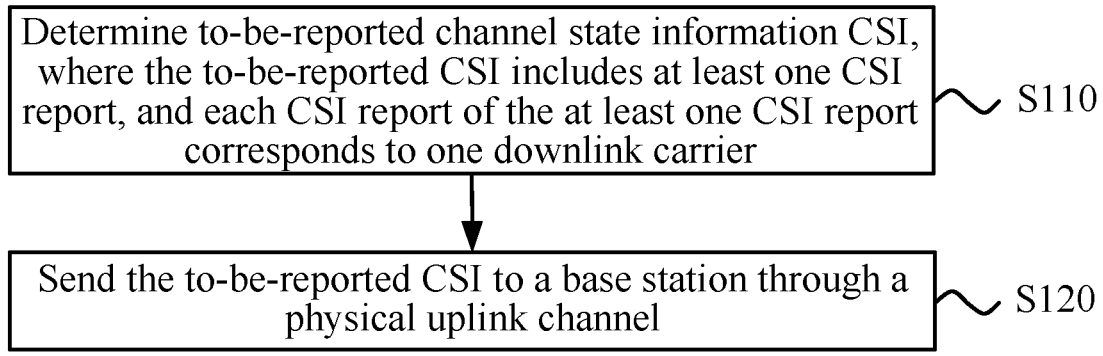
FIG. 1 is a schematic flowchart of a method for transmitting channel state information according to an embodiment of the present invention.

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

It should be understood that the technical solutions in the present invention may be applied to various communications systems, such as a Global System for Mobile Communications (Global System for Mobile Communications, "GSM" for short), a Code Division Multiple Access (Code Division Multiple Access, "CDMA" for short) system, a Wideband Code Division Multiple Access (Wideband Code Division Multiple Access, "WCDMA" for short) system, a General Packet Radio Service (General Packet Radio Service, "GPRS" for short) system, a Long Term Evolution (Long Term Evolution, "LTE" for short) system, an LTE Frequency Division Duplex (Frequency Division Duplex, "FDD" for short) system, an LTE Time Division Duplex (Time Division Duplex, "TDD" for short) system, and a Universal Mobile Telecommunication System (Universal Mobile Telecommunication System, "UMTS" for short).

It should also be understood that in the embodiments of the present invention, a user equipment (User Equipment, "UE" for short) may be called a terminal (Terminal), a mobile station (Mobile Station, "MS" for short), a mobile terminal (Mobile Terminal), or the like. The user equipment may communicate with one or more core networks through a radio access network (Radio Access Network, "RAN" for short), for example, the user equipment may be a mobile phone (or called a "cellular" phone), a computer with a mobile terminal, or the like, and for example, the user equipment may also be a portable, pocket-sized, hand-held, computer-embedded, or vehicle-mounted mobile apparatus, which exchanges voice and/or data with the radio access network.

In the embodiments of the present invention, a base station may be a base station (Base Transceiver Station, "BTS" for short) in the GSM or CDMA, a base station (NodeB, "NB" for short) in the WCDMA, or an evolved base station (Evolved Node B, "ENB" or "e-NodeB" for short) in the LTE. The present invention does not set a limitation to this. For ease of description, the following embodiments are described by using a base station ENB and a user equipment UE as an example.

It should be noted that channel state information CSI includes periodic CSI and aperiodic CSI. A user equipment may feed back the periodic CSI on a physical uplink control channel (Physical Uplink Control Channel, "PUCCH" for short). The periodic CSI includes information such as a channel quality indicator (Channel quality Indicator, "CQI" for short), a precoding matrix indicator (Precoding Matrix Indicator, "PMI" for short), a rank indication (Rank Indication, "RI" for short), and a precoding type indicator (Precoding Type Indicator, "PTI" for short). The periodic CSI may be reported on the PUCCH in multiple modes, for example, in an LTE Release 10 (Rel-10) system, modes for reporting the periodic CSI include mode (mode) 1-1, mode 1-1 , mode 2-0 , and mode 2-1 . It should be understood that the embodiments of the present invention are described by using the periodic CSI as an example. However, the embodiments of the present invention are not limited thereto.

One reporting mode may correspond to multiple reporting types, and different reporting types correspond to different reporting content. For example, in an LTE Rel-10 system, the periodic CSI may include the following reporting types: reporting type 1 (Type 1), which supports feedback of a subband CQI selected by a user equipment; reporting type 1a (Type 1a), which supports subband CQI feedback and second PMI feedback; reporting type 2a (Type 2a), which supports broadband PMI feedback; reporting type 3 (Type 3), which supports RI feedback; reporting type 4 (Type 4), which supports broadband CQI feedback; reporting type 5 (Type 5), which supports RI feedback and broadband PMI feedback; and reporting type 6 (Type 6), which supports RI feedback and PTI feedback. Because different reporting types of the periodic CSI correspond to different reporting content, and different reporting content corresponds to different target performance requirements, different reporting types of the periodic CSI correspond to different target performance requirements. For example, a performance requirement of reporting type 3 may be a block error ratio (Block Error Ratio, "BLER" for short) BLER=10e-3, while a performance requirement of reporting type 4 may be a block error ratio BLER=10e-2.

A base station may configure a reporting mode, a reporting period, and a subframe offset of periodic CSI of each carrier semi-statically through higher-layer signaling; and the user equipment may determine, according to the reporting mode indicated in the higher-layer signaling, a reporting type of CSI that needs to be reported, and determine a reporting moment of CSI of each reporting type according to the reporting period and the subframe offset that are indicated in the higher-layer signaling. In addition, for each carrier, CSI of only one reporting type is reported at one reporting moment. Therefore, in a carrier aggregation scenario, channel state information of multiple downlink carriers may need to be reported on one subframe, and reporting modes of the periodic CSI of different downlink carriers may be the same or different; that is, in the carrier aggregation scenario, it may occur that CSI of different reporting types from different carriers is reported on one subframe. However, because CSI of different reporting types corresponds to different performance requirements, how to ensure that the CSI of different reporting types that is reported on a same subframe can meet corresponding performance requirements is a technical problem that needs to be further solved in the present invention.

FIG. 1 shows a schematic flowchart of a method for transmitting channel state information according to an embodiment of the present invention. As shown in FIG. 1, the method includes:

S110. Determine to-be-reported channel state information CSI, where the to-be-reported CSI includes at least one CSI report, and each CSI report of the at least one CSI report corresponds to one downlink carrier.

According to information, such as a reporting mode, a reporting period, and a subframe offset of periodic CSI, configured semi-statically through higher-layer signaling, reporting types of the periodic CSI of each carrier may vary with CSI reporting moments, and different reporting types correspond to different reporting content. In the embodiment of the present invention, reporting content of a downlink carrier at a given reporting moment may be collectively called a CSI report (CSI report) of the downlink carrier at the given reporting moment; in other words, the CSI report corresponds to the downlink carrier, or the CSI report is a CSI report that corresponds to the downlink carrier. It should be noted that an additional carrier (Additional Carrier, Extension Carrier, or Carrier Segment) may exist in a carrier aggregation scenario, and the additional carrier may be attached to an independent carrier. In this case, the additional carrier and the carrier to which the additional carrier is attached may be considered as one downlink carrier, and therefore, the correspondence of one CSI report to one downlink carrier in the embodiment of the present invention may also include a case where the CSI report corresponds to the additional carrier and the carrier to which the additional carrier is attached. Certainly, CSI of the additional carrier may also be fed back independently, and in this case, a CSI report of the additional carrier corresponds only to the additional carrier.

S120. Send the to-be-reported CSI to a base station through a physical uplink channel.

The physical uplink channel in this step may be a physical uplink control channel (PUCCH), or a physical uplink shared channel (PUSCH), or be in a format of another channel capable of transmitting the CSI.

For at least one CSI report to be reported that needs to be reported on a same subframe, a user equipment may firstly determine the to-be-reported channel state information CSI according to a preset rule, where the to-be-reported CSI includes at least one CSI report, and each CSI report of the at least one CSI report corresponds to one downlink carrier; that is, the user equipment needs to determine to report CSI corresponding to which downlink carriers according to the preset rule. After the user equipment determines the to-be-reported CSI, the user equipment may send the to-be-reported CSI to the base station through the physical uplink channel, thereby transmitting channel state information from different downlink carriers on the same subframe. It should be noted that the transmitting channel state information from different downlink channels on the same subframe in the embodiment of the present invention refers to how to transmit channel state information if the transmitting channel state information from different downlink carriers on the same subframe is supported in the carrier aggregation scenario, and may be transmitting channel state information from multiple downlink carriers at each CSI reporting moment, and may also be transmitting channel state information of a single downlink carrier at several CSI reporting moments and transmitting channel state information from multiple carriers at another CSI reporting moment.

Therefore, according to the method for transmitting channel state information in the embodiment of the present invention, channel state information from different downlink carriers can be transmitted on a same subframe, and a performance requirement on the transmission of channel state information can be ensured and power utilization efficiency can be improved by taking into consideration factors such as reporting types of and/or the number of channel state information reports that need to be transmitted on the same subframe, a capacity of a corresponding physical uplink channel, attributes of downlink carriers, priorities of physical uplink channel resources, and the number of coding bits.

In S110, the user equipment may determine the to-be-reported CSI according to various preset rules, and the following describes in detail how the user equipment determines the to-be-reported CSI. It should be understood that in the embodiment of the present invention, as indicated in the higher-layer signaling, X channel state information reports that correspond to X downlink carriers and Y channel state information reports that correspond to Y downlink carriers need to be reported on a same subframe, and in other words, the X channel state information reports that correspond to the X downlink carriers collide with the Y channel state information reports that correspond to the Y downlink carriers, or in short, channel state information reports of the X downlink carriers collide with channel state information reports of the Y downlink carriers, where X and Y are natural numbers. The user equipment may determine the to-be-reported CSI in one of the following manners:

Manner 1

In the embodiment of the present invention, optionally, reporting types of all CSI reports in the to-be-reported CSI all belong to a first CSI reporting type or a second CSI reporting type, where a performance requirement of the first CSI reporting type is higher than a performance requirement of the second CSI reporting type.

Optionally, the first CSI reporting type includes reporting type 3, reporting type 5, and reporting type 6; and the second CSI reporting type includes reporting type 2, reporting type 2b, reporting type 2c, reporting type 4, reporting type 1, reporting type 1a, and reporting type 2a. Alternatively, the first CSI reporting type includes reporting type 3, reporting type 5, reporting type 6, and reporting type 2a; and the second CSI reporting type includes reporting type 2, reporting type 2b, reporting type 2c, reporting type 4, reporting type 1, and reporting type 1a.

It should be understood that the foregoing classification of the reporting types is merely an exemplary solution in the embodiment of the present invention, and the embodiment of the present invention is not limited thereto. For example, the first CSI reporting type may include at least one reporting type among reporting type 3, reporting type 5, and reporting type 6; and the second CSI reporting type may include at least one reporting type among reporting type 2, reporting type 2b, reporting type 2c, reporting type 4, reporting type 1, reporting type 1a, and reporting type 2a.

It should also be understood that the embodiment of the present invention is described by only using classifying the reporting types into two categories as an example. However, the embodiment of the present invention is not limited thereto. The reporting types may also be classified into more categories in the embodiment of the present invention. In this case, reporting types of all CSI reports in the to-be-reported CSI all belong to a first CSI reporting type, a second CSI reporting type, or a third CSI reporting type, where a performance requirement of the first CSI reporting type is higher than a performance requirement of the second CSI reporting type, and the performance requirement of the second CSI reporting type is higher than a performance requirement of the third CSI reporting type.

For example, the reporting types of the CSI reports may be classified into three categories, where the first CSI reporting type includes reporting type 3, reporting type 5, and reporting type 6; the second CSI reporting type includes reporting type 2, reporting type 2b, reporting type 2c, and reporting type 4; and the third CSI reporting type includes reporting type 1, reporting type 1a, and reporting type 2a. Alternatively, the first CSI reporting type includes reporting type 3, reporting type 5, reporting type 6, and reporting type 2a; the second CSI reporting type includes reporting type 2, reporting type 2b, reporting type 2c, and reporting type 4; and the third CSI reporting type includes reporting type 1 and reporting type 1a.

In this manner of the embodiment of the present invention, the user equipment may determine the to-be-reported channel state information CSI according to the reporting types of channel state information reports that need to be transmitted on a same subframe and/or the capacity of the corresponding physical uplink channel.

Optionally, the determining, by the user equipment, the to-be-reported CSI includes:

when at least one first CSI report and at least one second CSI report need to be reported on the same subframe, determining a part or all of first CSI reports among the at least one first CSI report as the to-be-reported CSI, where a reporting type of the first CSI report belongs to the first CSI reporting type, and a reporting type of the second CSI report belongs to the second CSI reporting type.

Specifically speaking, if the X CSI reports that correspond to the X downlink carriers collide with the Y CSI reports that correspond to the other Y downlink carriers, the X CSI reports that correspond to the X downlink carriers all belong to the first CSI reporting type, and the Y CSI reports that correspond to the Y downlink carriers all belong to the second CSI reporting type, the Y CSI reports that correspond to the Y downlink carriers are discarded, and a part or all of CSI reports among the X CSI reports that correspond to the X downlink carriers are reported, where X and Y are positive integers. It should be understood that when a value of X is greater than 1, the X CSI reports that correspond to the X downlink carriers may correspond to multiple different reporting types, and the X CSI reports that correspond to the X downlink carriers may also correspond to the same reporting type. However, even if the X CSI reports that correspond to the X downlink carriers correspond to multiple different reporting types, the X CSI reports that correspond to the X downlink carriers all belong to the first CSI reporting type. Similarly, the Y CSI reports that correspond to the Y downlink carriers all belong to the second CSI reporting type, and for brevity, no further details are provided herein.

For example, if CSI reports of carrier 1, carrier 2, and carrier 3 need to be reported on a same subframe, according to a configuration of higher-layer signaling, on the subframe, a reporting type of a CSI report that corresponds to carrier 1 is Type 3, a reporting type of a CSI report that corresponds to carrier 2 is Type 4, and a reporting type of a CSI report that corresponds to carrier 3 is Type 5; in this step, the X downlink carriers refer to carrier 1 and carrier 3, the X channel state information reports that correspond to the X downlink carriers refer to the CSI report that corresponds to carrier 1 and the CSI report that corresponds to carrier 3, and reporting types that correspond to the X CSI reports corresponding to the X downlink carriers are Type 3 and Type 5, belonging to the first CSI reporting type; and the Y channel state information reports that correspond to the Y downlink carriers refer to the CSI report that corresponds to carrier 2, and a reporting type of the CSI report is Type 4, belonging to the second CSI reporting type. In this case, according to the preset rule in the embodiment of the present invention, the user equipment discards the CSI report that corresponds to carrier 2, and reports the CSI reports that correspond to carrier 1 and carrier 3, that is, the to-be-reported channel state information includes the CSI report that corresponds to carrier 1 and the CSI report that corresponds to carrier 3.

Optionally, the determining, by the user equipment, a part or all of first CSI reports among the at least one first CSI report as the to-be-reported CSI includes:

when the total number of information bits of the at least one first CSI report is less than or equal to the capacity of the physical uplink channel, determining all first CSI reports among the at least one first CSI report as the to-be-reported CSI; and when the total number of the information bits of the at least one first CSI report is greater than the capacity of the physical uplink channel, sequencing the at least one first CSI report according to attributes of downlink carriers that correspond to all first CSI reports among the at least one first CSI report, and determining, among the sequenced at least one first CSI report, M first CSI reports that rank the top as the to-be-reported CSI, where the total number of information bits of the M first CSI reports is less than or equal to the capacity of the physical uplink channel, and M is a natural number. In other words, when the total number of the information bits of the at least one first CSI report is greater than the capacity of the physical uplink channel, the determining a part of first CSI reports among the at least one first CSI report as the to-be-reported CSI specifically includes: determining, among the at least one first CSI report, M first CSI reports with relatively high priorities as the to-be-reported CSI. A method for determining the M first CSI reports with relatively high priorities may be: sequencing the at least one first CSI report according to attributes of downlink carriers that correspond to all first CSI reports among the at least one first CSI report, and determining, among the sequenced at least one first CSI report, M first CSI reports that rank the top as the M first CSI reports with relatively high priorities, where the total number of information bits of the M first CSI reports is less than or equal to the capacity of the physical uplink channel, and M is a natural number.

Preferably, the total number of information bits of the M first CSI reports is less than or equal to the capacity of the physical uplink channel, and the total number of information bits of M+1 first CSI reports that rank the top is greater than the capacity of the physical uplink channel. Preferably, the at least one first CSI report is sequenced in ascending order of downlink carrier indexes of downlink carriers. It should be understood that the at least one first CSI report may also be sequenced in descending order of downlink carrier indexes of downlink carriers or in ascending or descending order of other attributes of the downlink carriers.

Specifically speaking, if the X CSI reports that correspond to the X downlink carriers collide with the Y CSI reports that correspond to the other Y downlink carriers, the X CSI reports that correspond to the X downlink carriers belong to the first CSI reporting type, the Y CSI reports that correspond to the Y downlink carriers belong to the second CSI reporting type, and the total number of information bits of the X CSI reports that correspond to the X downlink carriers is less than or equal to the capacity of the physical uplink channel, the Y CSI reports that correspond to the Y downlink carriers are discarded, and all CSI reports among the X CSI reports that correspond to the X downlink carriers are reported; that is, the X CSI reports that correspond to the X downlink carriers are determined as the to-be-reported CSI, where X and Y are positive integers.

For example, when the physical uplink channel for transmitting a periodic CSI report is a PUCCH format 3 (Format 3), a capacity of the PUCCH Format 3 may be 22 bits, and in this case, if the total number of information bits of the X CSI reports that correspond to the X downlink carriers is less than 22 bits, the X CSI reports that correspond to the X downlink carriers may be determined as the to-be-reported CSI according to the preset rule in the embodiment of the present.

It should be understood that the embodiment of the present invention describes the physical uplink channel by using a PUCCH as an example. However, the embodiment of the present invention is not limited thereto. The physical uplink channel may also be another channel, for example, a physical uplink shared channel (Physical Uplink Share Channel, "PUSCH" for short), or the like. It should also be understood that the capacity of the physical uplink channel in the embodiment of the present invention refers to a capacity of one physical uplink channel, for example, a capacity of one PUCCH format 3.

If the X CSI reports that correspond to the X downlink carriers collide with the Y CSI reports that correspond to the other Y downlink carriers, the X CSI reports that correspond to the X downlink carriers belong to the first CSI reporting type, the Y CSI reports that correspond to the Y downlink carriers belong to the second CSI reporting type, and the total number of information bits of the X CSI reports that correspond to the X downlink carriers is greater than the capacity of the physical uplink channel, the Y CSI reports that correspond to the Y downlink carriers are firstly discarded, and then the to-be-reported CSI is determined among the X CSI reports that correspond to the X downlink carriers; that is, a part of the X CSI reports that correspond to the X downlink carriers are determined as the to-be-reported CSI, where X and Y are positive integers.

For example, if the total number of information bits of the X CSI reports that correspond to the X downlink carriers is greater than a capacity N of the PUCCH, the to-be-reported CSI is a part of the X CSI reports that correspond to the X downlink carriers. Specifically, M (where M is an integer, and M<X) CSI reports to be reported may be determined in the following manner: sequencing, in ascending or descending order of attributes of downlink carriers, the X CSI reports that correspond to the X downlink carriers, discarding X1 (where X1 is a positive integer, and M+X1=X) CSI reports that rank the bottom, and reporting the M CSI reports that rank the top, where the total number of information bits of the M CSI reports is less than or equal to N. The attributes of the downlink carriers may be carrier indexes, and preferably, the X CSI reports that correspond to the X downlink carriers are sequenced in ascending order of downlink carrier indexes. Preferably, M is set to a value that makes the total number of information bits of M+1 CSI reports that rank the top greater than the capacity N of the PUCCH. Certainly, the X CSI reports that correspond to the X downlink carriers may also be sequenced in descending order of the downlink carrier indexes.

In this manner of the embodiment of the present invention, when a CSI report of the first channel state information reporting type collides with a CSI report of the second channel state information reporting type, the CSI report of the second channel state information reporting type is discarded, only the CSI report of the first channel state information reporting type is reported. This ensures that the CSI report of the first channel state information reporting type meets a target performance requirement; in addition, this improves power utilization efficiency and is also applicable to a power-limited user equipment compared with a method in which concurrent transmission of the first channel state information reporting type and the second channel state information reporting type is supported and the target performance requirement of the first CSI reporting type is met by directly increasing transmit power.

Figure 2:
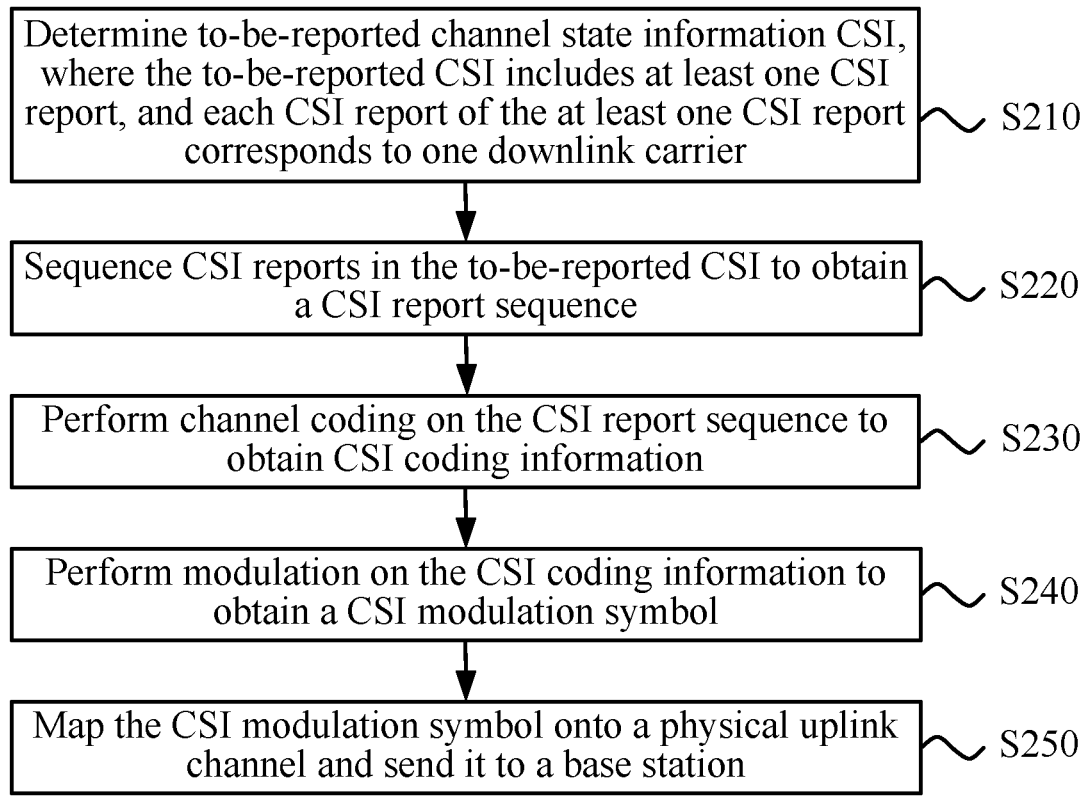
FIG. 2 is a schematic flowchart of a method for transmitting channel state information according to another embodiment of the present invention.

It should be noted that when this manner is used in this step (step S110) and if the method described in this manner is used in an embodiment shown in FIG. 2, preferably, this manner of the embodiment of the present invention is jointly used with manner 2 in step S220 and manner 1 in step S230.

Manner 2

In this manner of the embodiment of the present invention, the user equipment may determine the to-be-reported channel state information CSI according to the total number of information bits of channel state information reports that need to be transmitted on a same subframe, a capacity of the physical uplink channel, and/or priorities of reporting types.

Optionally, the determining, by the user equipment, the to-be-reported CSI includes:

when the total number of information bits of at least one CSI report to be reported that needs to be reported on the same subframe is less than or equal to the capacity of the physical uplink channel, determining all CSI reports among the at least one CSI report to be reported as the to-be-reported CSI; and when the total number of information bits of the at least one CSI report to be reported that needs to be reported on the same subframe is greater than the capacity of the physical uplink channel, determining a part of CSI reports among the at least one CSI report to be reported as the to-be-reported CSI. The determining a part of CSI reports among the at least one CSI report to be reported as the to-be-reported CSI may include: sequencing, according to priorities of reporting types of all CSI reports to be reported among the at least one CSI report to be reported and/or attributes of corresponding downlink carriers, the at least one CSI report to be reported; and determining, among the sequenced at least one CSI report to be reported, M CSI reports to be reported that rank the top as the to-be-reported CSI, where the total number of information bits of the M CSI reports to be reported is less than or equal to the capacity of the physical uplink channel, and M is a natural number.

For example, if the total number of information bits of the X CSI reports that correspond to the X downlink carriers is less than or equal to a capacity N of a PUCCH channel, the to-be-reported CSI is the X CSI reports that correspond to the X downlink carriers; and if the total number of information bits of the X CSI reports that correspond to the X downlink carriers is greater than the capacity N of the PUCCH channel, the to-be-reported CSI is a part of the X CSI reports that correspond to the X downlink carriers. Specifically, the to-be-reported CSI reports of the M (where M is a positive integer, and M<X) downlink carriers may be determined in the following manner: sequencing, in descending order of priorities of reporting types of the CSI reports, the X CSI reports that correspond to the X downlink carriers, and if the reporting types are the same, performing the sequencing in ascending order of carrier indexes of the downlink carriers; and discarding Y (where Y is a positive integer, and M+Y=X) CSI reports that rank the bottom, where the to-be-reported CSI is the M CSI reports, and the total number of information bits of the M CSI reports is less than or equal to N. Preferably, M is set to a value that makes the total number of information bits of M+1 CSI reports that rank the top greater than the capacity N of the PUCCH. The capacity of the PUCCH may be the number of information bits that the PUCCH can actually transmit, for example, for a PUCCH format 3, the capacity of this PUCCH may be 22 bits; or the capacity of the PUCCH may also be the maximum number of information bits that meet PUCCH channel coverage and can be transmitted, and the number of the maximum information bits may be a value notified by a higher layer.

Optionally, priorities of reporting types of CSI reports include a first priority, a second priority, and a third priority, where a reporting type with the first priority includes reporting type 3, reporting type 5, reporting type 6, and reporting type 2a; a reporting type with the second priority includes reporting type 2, reporting type 2b, reporting type 2c, and reporting type 4; and a reporting type with the third priority includes reporting type 1 and reporting type 1a.

It should be understood that the foregoing classification of the priorities of the reporting types is merely an exemplary solution in the embodiment of the present invention, and the embodiment of the present invention is not limited thereto. For example, the priorities of the reporting types of the CSI reports may also include a first priority and a second priority, where a reporting type with the first priority includes the first CSI reporting type, and a reporting type with the second priority includes the second CSI reporting type.

Manner 3

In the embodiment of the present invention, the user equipment may determine the to-be-reported channel state information CSI according to the number of channel state information reports that need to be transmitted on a same subframe and/or priorities of reporting types.

Optionally, the determining, by the user equipment, the to-be-reported CSI includes:

when the number of at least one CSI report to be reported that needs to be reported on the same subframe is less than or equal to a first value, determining all CSI reports among the at least one CSI report to be reported as the to-be-reported CSI, where the first value is greater than or equal to 2; and when the number of the at least one CSI report to be reported is greater than the first value, sequencing, in descending order of priorities of reporting types of all CSI reports among the at least one CSI report to be reported and/or in ascending order of carrier indexes of downlink carriers that correspond to all CSI reports among the at least one CSI report to be reported, the at least one CSI report to be reported; and determining, among the sequenced at least one CSI report to be reported, M CSI reports that rank the top as the to-be-reported CSI, where M is a natural number and is equal to the first value. The first value is preferably 2 in the present invention.

For example, if the number X of CSI reports to be reported on the same subframe is less than or equal to M, the X CSI reports that correspond to the X downlink carriers are reported; and if a value of X is greater than M, the to-be-reported CSI is M CSI reports among the X CSI reports that correspond to the X downlink carriers, where the value of M may be greater than or equal to 2, and is preferably 2 in the present invention. The M CSI reports to be reported may specifically be determined in the following manner: sequencing the CSI reports of the X downlink carriers in descending order of priorities of reporting types of CSI reports, and if the reporting types are the same, performing the sequencing in ascending order of carrier indexes of the downlink carriers; and determining the M CSI reports that rank the top as the to-be-reported CSI. In this manner, the M CSI reports to be reported have the highest priority among the X CSI reports that correspond to the X downlink carriers. It should be understood that for brevity, the priorities of the reporting types of the CSI reports are not further described herein.

Manner 4

In this manner of the embodiment of the present invention, the user equipment may determine the to-be-reported channel state information CSI according to priorities of physical uplink channel resources that correspond to channel state information reports that need to be transmitted on a same subframe.

Optionally, the determining, by the user equipment, the to-be-reported CSI includes:

when at least one CSI report to be reported that needs to be reported on the same subframe corresponds to a same physical uplink channel resource, determining all CSI reports among the at least one CSI report to be reported as the to-be-reported CSI; and when the at least one CSI report to be reported that needs to be reported on the same subframe corresponds to at least two physical uplink channel resources, determining, among the at least one CSI report to be reported, a part or all of CSI reports corresponding to a physical uplink channel resource with the highest priority as the to-be-reported CSI.

Preferably, all CSI reports among the at least one CSI report to be reported that correspond to the physical uplink channel resource with the highest priority are determined as the to-be-reported CSI. Preferably, among the at least two physical uplink channel resources, the physical uplink channel resource with the highest priority is a physical uplink channel resource corresponding to a CSI report of a reporting type that has the highest priority, or a physical uplink channel resource corresponding to a CSI report of a downlink carrier that has the minimum carrier index.

For example, if the X CSI reports that correspond to the X downlink carriers correspond to a same PUCCH resource, the to-be-reported CSI is the X CSI reports that correspond to the X downlink carriers; and if the X CSI reports that correspond to the X downlink carriers correspond to at least two PUCCH resources, the to-be-reported CSI is a part or all of CSI reports corresponding to a PUCCH resource with the highest priority among the at least two PUCCH resources. For example, the PUCCH resource with the highest priority among the at least two PUCCH resources may be determined by using any one of the following methods:

Method 1: A PUCCH resource, which corresponds to a CSI report with the highest priority among the X CSI reports that correspond to the X downlink carriers, is the PUCCH resource with the highest priority among the at least two PUCCH resources. The CSI report with the highest priority among the X CSI reports is the CSI report of a reporting type that has the highest priority among the X CSI reports, and if a priority of a reporting type of a CSI report of a downlink carrier is the same as a priority of a reporting type of a CSI report of another downlink carrier, a CSI report corresponding to a downlink carrier that has a smaller carrier index has a higher priority. Particularly, if priorities of reporting types of the X CSI reports that correspond to the X downlink carriers are the same, the CSI report with the highest priority among the X CSI reports is the CSI report of the downlink carrier that has the minimum carrier index. If priorities of reporting types of a part of CSI reports among the X CSI reports that correspond to the X downlink carriers are the same, the CSI report with the highest priority is determined according to the priorities of the reporting types; and if there are multiple CSI reports with the highest priority, the CSI report, which is among the multiple CSI reports with a reporting type that has the highest priority and corresponds to a downlink carrier that has the smallest carrier index, is then taken as the CSI report with the highest priority among the X CSI reports.

In this manner, the method for determining the to-be-reported channel state information CSI by determining the PUCCH resource with the highest priority among the at least two PUCCH resources by using this method (method 1) may be equivalent to: determining K channel state information CSI reports among the X channel state information CSI reports as the to-be-reported channel state information CSI reports, where the K channel state information CSI reports include the channel state information CSI report of the reporting type that has the highest priority, and the K channel state information CSI reports have a same physical uplink control channel resource.

Method 2: A PUCCH resource that corresponds to the minimum or maximum number of carriers among the at least two PUCCH resources is the PUCCH resource with the highest priority.

In this manner, the method for determining the to-be-reported channel state information CSI by determining the PUCCH resource with the highest priority among the at least two PUCCH resources by using this method (method 2) may be equivalent to: determining K channel state information CSI reports among the X channel state information CSI reports as the to-be-reported channel state information, where the K channel state information CSI reports have a same physical uplink control channel resource, and the value of K is the maximum value of the number of channel state information CSI reports that correspond to all physical uplink control channel resources.

Method 3: A PUCCH resource among the at least two PUCCH resources that corresponds to a CSI report that has the minimum number of information bits is the PUCCH resource with the highest priority. The total number of information bits of a CSI report that corresponds to a PUCCH resource refers to the total number of information bits of a CSI report of at least one downlink carrier that corresponds to the PUCCH resource.

It should be understood that in the embodiment of the present invention, the physical uplink channel resource with the highest priority may also be determined according to another factor, the physical uplink channel resource is not limited to a PUCCH resource, and another resource, for example, a PUSCH resource or the like, may also be included.

It should be understood that in the carrier aggregation scenario in S110, the base station may configure semi-statically, through higher-layer signaling, a reporting mode, a reporting period, a subframe offset, and a resource index of periodic CSI that corresponds to each downlink carrier. The user equipment may determine, according to the reporting period and the subframe offset that correspond to each downlink carrier and are indicated in the higher-layer signaling, X downlink carriers from which CSI needs to be reported at a current CSI reporting moment, where X1 is a positive integer; the user equipment may further determine, according to the reporting mode of periodic CSI that corresponds to each downlink carrier and is indicated in the higher-layer signaling, a reporting type of a CSI report that corresponds to each downlink carrier of the X downlink carriers; the user equipment may further learn, according to the reporting type of the CSI report of each downlink carrier of the X downlink carriers, CSI reporting content of each downlink carrier of the X downlink carriers, that is, learn the CSI report (Report) that corresponds to each downlink carrier of the X downlink carriers; the user equipment may further determine, according to the CSI report that corresponds to each downlink carrier of the X downlink carriers, the number of information bits of the CSI report that corresponds to each downlink carrier of the X downlink carriers; and the user equipment may further learn, according to the determined X downlink carriers from which CSI reports need to be reported at each CSI reporting moment, the CSI reporting content that corresponds to each downlink carrier of the X downlink carriers, or the number of information bits of the CSI report of each downlink carrier of the X downlink carriers, the total number of information bits of the X CSI reports that correspond to the X downlink carriers. The user equipment may further determine, according to the number of information bits of the CSI report of each downlink carrier of the X downlink carriers, the total number of information bits of X2 CSI reports that correspond to any X2 (where X2 is a positive integer, and X2<X) downlink carriers among the X downlink carriers. The user equipment may further learn, according to a resource indicator that corresponds to each downlink carrier and is indicated in the higher-layer signaling, a PUCCH resource that corresponds to a CSI report of each carrier. PUCCH formats that correspond to the X CSI reports corresponding to the X downlink carriers may be the same, for example, they all are PUCCH format 3; and the PUCCH formats that correspond to the X CSI reports corresponding to the X downlink carriers may also be different, for example, all PUCCH formats that correspond to Y CSI reports corresponding to Y downlink carriers among the X downlink carriers may be PUCCH format 3, and all PUCCH formats that correspond to X-Y CSI reports corresponding to the remaining X-Y carriers may be PUCCH format 2.

PUCCH resources that correspond to the X CSI reports corresponding to the X downlink carriers may be the same, for example, they all are PUCCH format 3 and resource indexes that correspond to CSI reports of all carriers are the same, or they all are PUCCH formats 2 and resource indexes that correspond to CSI reports of all carriers are the same; and the PUCCH resources that correspond to the CSI reports of the X downlink carriers may also be different, for example, all PUCCH resources that correspond to CSI reports of Y downlink carriers among the X downlink carriers may be first PUCCH resources, and all PUCCH resources that correspond to CSI reports of the remaining X-Y carriers may be second PUCCH resources. The first PUCCH resource and the second PUCCH resource may correspond to different formats, for example, a format that corresponds to the first PUCCH resource may be PUCCH format 3, and a format that corresponds to the second PUCCH resource may be PUCCH format 2; and the first PUCCH resource and the second PUCCH resource may also correspond to a same PUCCH format but have different resource indexes, for example, the PUCCH formats may all be PUCCH format 3, but the first PUCCH resource corresponds to a resource index of 10, while the second PUCCH resource corresponds to a resource index of 12. A value of a resource index may be 0 to 512.

It should be understood that in step S110 of the embodiment of the present invention, the to-be-reported CSI may also be determined by using other methods than the foregoing methods.

Therefore, according to the method for transmitting channel state information in the embodiment of the present invention, channel state information from different downlink carriers can be transmitted on a same subframe, and a performance requirement on the transmission of channel state information can be ensured and power utilization efficiency can be improved by taking into consideration factors such as reporting types of and/or the number of channel state information reports that need to be transmitted on the same subframe, a capacity of a corresponding physical uplink channel, attributes of downlink carriers, priorities of physical uplink channel resources, and the number of coding bits; in addition, according to the method in the embodiment of the present invention, performance of channel state information of a reporting type that has a higher priority can be improved.

In S120, the user equipment sends the to-be-reported CSI to the base station through the physical uplink channel, for example, a PUCCH. Optionally, the sending the to-be-reported CSI to the base station through the physical uplink channel includes: performing, by the user equipment, channel coding on CSI reports in the to-be-reported CSI to obtain CSI coding information; performing, by the user equipment, modulation on the CSI coding information to obtain a CSI modulation symbol; and mapping, by the user equipment, the CSI modulation symbol onto the physical uplink channel, and sending it to the base station.

Optionally, the sending, by the user equipment, the to-be-reported CSI to the base station through the physical uplink channel further includes: sequencing, by the user equipment, the CSI reports in the to-be-reported CSI to obtain a CSI information bit sequence; and the performing, by the user equipment, channel coding on the CSI reports in the to-be-reported CSI includes: performing channel coding on the CSI information bit sequence to obtain the CSI coding information.

The following describes in detail another embodiment of the present invention with reference to FIG. 2. As shown in FIG. 2, a method for transmitting channel state information according to the embodiment of the present invention includes:

In S210, a user equipment determines to-be-reported channel state information CSI, where the to-be-reported CSI includes at least one CSI report, and each CSI report of the at least one CSI report corresponds to one downlink carrier. Step S210 is similar to S110 shown in FIG. 1, and for brevity, no further details are provided herein.

In S220, the user equipment sequences CSI reports in the to-be-reported CSI to obtain a CSI information bit sequence. It is assumed that the to-be-reported CSI includes K CSI reports, and the user equipment sequences the CSI reports in the to-be-reported CSI, that is, the user equipment sequences the to-be-reported K CSI reports, which means that the user equipment connects in series the K CSI reports according to a preset rule, so as to obtain an information bit sequence that corresponds to the to-be-reported CSI, namely, the CSI information bit sequence. Specifically, in this step, the CSI reports in the to-be-reported CSI may be sequenced in one of the following manners:

Manner 1

Optionally, the user equipment may sequence the CSI reports in the to-be-reported CSI in ascending order of priorities of reporting types of the CSI reports, and if the priorities of the reporting types of the CSI reports are the same, perform the sequencing in descending order of carrier indexes of downlink carriers that correspond to the CSI reports. Specifically, the K CSI reports are firstly sequenced in ascending order of the priorities of the reporting types of the CSI reports, and if priorities of reporting types of a part of CSI reports among the K CSI reports are the same, the part of the CSI reports is sequenced in descending order of carrier indexes of downlink carriers that correspond to the CSI reports. Particularly, when the priorities of the reporting types of the K CSI reports are the same, the K CSI reports only need to be sequenced in descending order of carrier indexes of downlink carriers that correspond to the CSI reports. When this sequencing manner is used, if the total number of information bits of the K CSI reports is greater than 11 bits and is an odd number, this sequencing manner can improve performance of channel state information with a reporting type that has a higher priority, thereby ensuring performance of a CSI report that has a high performance requirement to the greatest extent.

It should be noted that when any one of manner 2 to manner 4 is used to determine the to-be-reported CSI in step S210 (that is, step S110), if this manner is used in this step (step S220) to sequence the CSI reports in the to-be-reported CSI, the performance of channel state information of the reporting type that has a higher priority can be improved, thereby ensuring the performance of the CSI report that has a high performance requirement to the greatest extent.

Manner 2

It should be understood that the user equipment may also sequence the CSI reports in the to-be-reported CSI in ascending or descending order of attributes of downlink carriers that correspond to the CSI reports, and an attribute of a downlink carrier includes a downlink carrier index. The CSI reports in the to-be-reported CSI are sequenced preferably in descending order of carrier indexes of the downlink carriers that correspond to the CSI reports.

It should also be understood that when the to-be-reported CSI finally determined by the user equipment includes only one CSI report, the CSI report does not need to be sequenced; that is, the process goes directly from S210 to S230, and in this case, channel coding is directly performed on the information bit sequence that corresponds to the CSI report in S230. When the user equipment uses separate channel coding in step S230, step S220 may also be unnecessary; that is, the process goes directly from S210 to S230.

In S230, the user equipment performs channel coding on the to-be-reported CSI to obtain CSI coding information. The user equipment may perform the channel coding on the to-be-reported CSI in one of the following manners:

Manner 1: Perform Joint Channel Coding on the to-be-Reported CSI.

In the embodiment of the present invention, the case where the user equipment performs joint channel coding on the to-be-reported CSI is actually performing jointly channel coding on the CSI information bit sequence obtained in step S220, which specifically includes: When determining that the total number of information bits of the K CSI reports in the to-be-reported channel state information is less than or equal to 11 bits, the user equipment uses a Reed-Muller RM (Reed-Muller) (32, O) code for coding; and when the total number of information bits of the K CSI reports is greater than 11 bits, uses dual Reed-Muller RM (Reed-Muller) (32, O) codes for coding. It should be understood that the embodiment of the present invention is described by using performing channel coding by using the dual Reed-Muller RM codes as an example. However, the embodiment of the present invention is not limited thereto; for example, a tail biting convolutional code (Tail Biting Convolutional Code, "TBCC" for short) may also be used for channel coding.

When the dual Reed-Muller RM (32, O) codes are used to perform channel coding on the to-be-reported K channel state information reports, the performing, by the user equipment, channel coding on the CSI information bit sequence may include:

dividing, by the user equipment, the total information bits of the K channel state information reports into two parts, where specifically, if the total number of information bits is an even number, the user equipment divides the total information bits into two parts that have the same number of information bits; and if the total number of information bits is an odd number, in the two parts of information bits divided by the user equipment from the total information bits, the number of information bits in a second part is one bit less than the number of information bits in a first part;

performing, by the user equipment, coding on information bits that correspond to each part by using the RM (32, O) code; and selecting coding bits alternatively from the two parts of information bits by taking Qm bits as the granularity, so as to obtain a new coding bit sequence, where Qm is a modulation mode of the CSI reports, for example, a quadrature phase shift keying (Quadrature Phase Shift Keying, "QPSK" for short) modulation mode.

If the method for sequencing the K CSI reports in S220 is "sequencing, by the user equipment, the CSI reports in the to-be-reported CSI in ascending order of priorities of reporting types of the CSI reports, and if the priorities of the reporting types of the CSI reports are the same, performing the sequencing in descending order of carrier indexes of downlink carriers that correspond to the CSI reports", because in S230, if the total number of information bits of channel state information reports of the X downlink carriers is an odd number, the number of information bits in the second part is one bit less than the number of information bits in the first part, and this allows a CSI report of a reporting type that has a higher priority to be put into the part that has a less number of information bits while coding methods and resources of the two parts of information bits are the same, performance of the CSI report of the reporting type that has the higher priority can be improved, thereby ensuring performance of a CSI report that has a high target performance requirement to the greatest extent.

It should be noted that the rule for sequencing the CSI reports in S220 may also be as follows: The user equipment sequences CSI reports of the X downlink carriers in descending order of priorities of reporting types of the CSI reports, and if the reporting types are the same, performs the sequencing in ascending order of carrier indexes of the downlink carriers; however, in this case, in S230, in the two parts of information bits divided by the user equipment from the total information bits, only when the number of information bits that correspond to the first part is one bit less than the number of information bits that correspond to the second part, the performance of the CSI report of the reporting type that has the higher priority can be improved, thereby ensuring the performance of the CSI report that has the high target performance requirement to the greatest extent.

Manner 2: Perform in the to-be-reported CSI separate channel coding on CSI reports that belong to a first channel state information reporting type and on CSI reports that belong to a second channel state information reporting type.

In this manner of the embodiment of the present invention, if reporting types of the K CSI reports all belong to the first CSI reporting type or all belong to the second CSI reporting type, joint channel coding is performed on the K CSI reports, that is, joint channel coding is performed on the CSI information bit sequence obtained in step S220; and if, among the K CSI reports, reporting types of X1 (where X1 is a positive integer, and X1<K) CSI reports belong to the first CSI reporting type, and reporting types of X2 (where X2 is a positive integer, and X2<X) CSI reports belong to the second CSI reporting type, separate channel coding is performed on the X1 CSI reports and the X2 CSI reports, where before the separate channel coding is performed, the X1 CSI reports and the X2 CSI reports may firstly be sequenced to obtain a first CSI report information bit sequence and a second CSI report information bit sequence, respectively, and the sequencing method may be performing the sequencing in descending or ascending order of carrier indexes of downlink carriers that correspond to the CSI reports.

Optionally, the performing in the to-be-reported CSI separate channel coding on CSI reports that belong to the first channel state information reporting type and CSI reports that belong to the second channel state information reporting type includes:

performing channel coding on at least one first CSI report and at least one second CSI report that are included in the to-be-reported CSI, so as to obtain the CSI coding information, where a reporting type of the first CSI report belongs to the first CSI reporting type, a reporting type of the second CSI report belongs to the second CSI reporting type, and a performance requirement of the first CSI reporting type is higher than a performance requirement of the second CSI reporting type.

Optionally, the performing channel coding on the at least one first CSI report and the at least one second CSI report that are included in the to-be-reported CSI includes:

allocating a first coding bit number and a second coding bit number to the at least one first CSI report and the at least one second CSI report, respectively, where the first coding bit number is greater than the second coding bit number; and performing channel coding on the at least one first CSI report and the at least one second CSI report according to the first coding bit number and the second coding bit number, respectively.

Specifically speaking, the user equipment performs, by using the RM (32, O) code, channel coding on a first CSI report information bit sequence formed by the sequenced CSI reports of the X1 downlink carriers and a second CSI report information bit sequence formed by the sequenced CSI reports of the X2 downlink carriers, and the number of coding bits that correspond to the sequenced CSI reports of the X1 downlink carriers is different from the number of coding bits that correspond to the sequenced CSI reports of the X2 downlink carriers, which may specifically be that the number of bits that correspond to the sequenced CSI reports of the X1 downlink carriers after the channel coding is greater than the number of bits that correspond to the sequenced CSI reports of the X2 downlink carriers after the channel coding.

For example, channel coding is performed by using the RM (32, O) code on the sequenced channel state information reports of the X1 downlink carriers and the sequenced channel state information reports of the X2 downlink carriers, and the number of bits that correspond to the sequenced channel state information reports of the X1 downlink carriers after the channel coding is $24*Q_m*(1/O_{CSI}^{X})*\beta_{offset}*O_{CSI}^{X1}$, and the number of bits that correspond to the sequenced channel state information reports of the X2 downlink carriers after the channel coding is $24*Q_m*(1-(1/O_{CSI}^{X}))*\beta_{offset}*O_{CSI}^{X1}$, where $Q_m$ is a modulation coding mode, $O_{CSI}^{X}$ is the total number of information bits of the CSI reports that correspond to the X1 and X2 downlink carriers, $O_{CSI}^{X}$ is the total number of information bits of the CSI reports of the X1 downlink carriers, and $\beta_{offset}$ is a value notified by higher-layer signaling, and may be, for example, a value notified by higher-layer signaling semi-statically.

In this step, separate coding is performed on the channel state information reports of the X1 downlink carriers and the channel state information reports of the X2 downlink carriers, and the channel state information reports of the X1 downlink carriers correspond to more coding bits, equivalent to allocating more resources to the channel state information reports of the X1 downlink carriers, thereby improving performance of the channel state information reports of the X1 downlink carriers, and meeting a performance requirement of the X1 downlink carriers. In addition, the method in which different coding bits are allocated to the channel state information reports of the X1 downlink carriers and the channel state information reports of the X2 downlink carriers may also be used, so that a signal-to-noise ratio of a target performance requirement met by the channel state information reports of the X1 downlink carriers is the same as a signal-to-noise ratio of a target performance requirement met by the channel state information reports of the X2 downlink carriers, thereby avoiding the problem that transmit power is increased to meet the performance requirement of the channel state information reports of the X1 downlink carriers while there is a surplus in the transmit power from the perspective of the performance requirement of the channel state information reports of the X2 downlink carriers. This improves power utilization efficiency.

It should be noted that in this step, the method for performing separate channel coding on the channel state information reports of the X downlink carriers may also be applied to other scenarios, for example, when a channel state information CSI report and hybrid automatic repeat acknowledgment information ACK/NACK need to be sent on a PUCCH channel, a target performance requirement of the ACK/NACK is higher than a target performance requirement of the CSI report, which is similar to the case in this step where the target performance requirement of the channel state information reports of the X1 downlink carriers is higher than that of the channel state information reports of the X2 downlink carriers, and therefore, the method for separate channel coding in this step may be applied to the case where the CSI report and the ACK/NACK are simultaneously transmitted, a specific method is similar to the description in this step, it only needs to replace the channel state information reports of the X1 downlink carriers in this step with the ACK/NACK to be transmitted, and replace the channel state information reports of the X2 downlink carriers in this step with the CSI report to be transmitted, and no further details about a specific mechanism are provided herein.

In S240, the user equipment performs modulation on the CSI coding information to obtain a CSI modulation symbol.

In S250, the user equipment maps the CSI modulation symbol onto the physical uplink channel and sends it to the base station.

It should be understood that the sequence numbers of the foregoing steps do not imply an execution sequence. The execution sequence of the steps should be determined according to functions and internal logic of the steps, which is not intended to limit the implementation process in the embodiment of the present invention in any way.

According to the method for transmitting channel state information in the embodiment of the present invention, channel state information from different downlink carriers can be transmitted on a same subframe, and a performance requirement on the transmission of channel state information can be ensured and power utilization efficiency can be improved by taking into consideration factors such as reporting types of and/or the number of channel state information reports that need to be transmitted on the same subframe, a capacity of a corresponding physical uplink channel, attributes of downlink carriers, priorities of physical uplink channel resources, and the number of coding bits.

Figure 3:
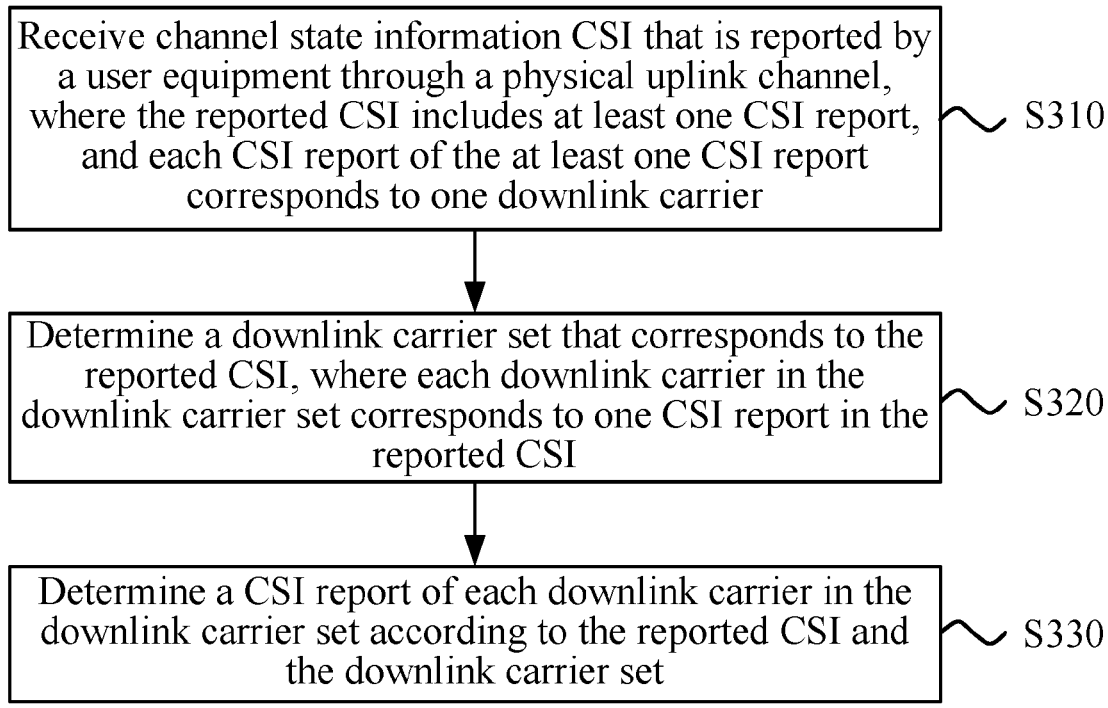
FIG. 3 is a schematic flowchart of a method for transmitting channel state information according to still another embodiment of the present invention.
Figure 4:
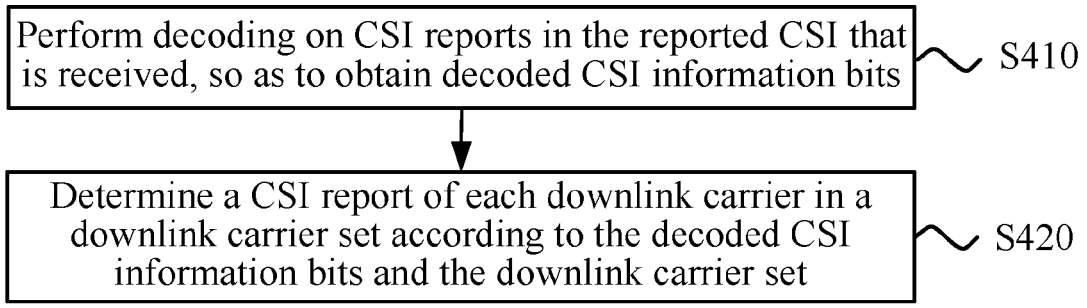
FIG. 4 is a schematic flowchart of a method for determining a channel state information report of each downlink carrier according to still another embodiment of the present invention.

The foregoing describes in detail the method for transmitting channel state information according to the embodiment of the present invention from the perspective of the user equipment with reference to FIG. 1 and FIG. 2, the following describes in detail a method for transmitting channel state information according to an embodiment of the present invention from the perspective of a base station with reference to FIG. 3 and FIG. 4, and it should be understood that for the description about the method from the perspective of the base station in the embodiment of the present invention, reference may be made to the description about the method from the perspective of the user equipment in the embodiment of the present invention.

FIG. 3 shows a schematic flowchart of a method for transmitting channel state information according to an embodiment of the present invention. As shown in FIG. 3, the method includes:

S310. Receive channel state information CSI that is reported by a user equipment through a physical uplink channel, where the reported CSI includes at least one CSI report, and each CSI report of the at least one CSI report corresponds to one downlink carrier.

S320. Determine a downlink carrier set that corresponds to the reported CSI, where each downlink carrier in the downlink carrier set corresponds to one CSI report in the reported CSI.

S330. Determine a CSI report of each downlink carrier in the downlink carrier set according to the reported CSI and the downlink carrier set.

After receiving the CSI reported by the user equipment through the physical uplink channel, the base station may determine the CSI report of each downlink carrier in the downlink carrier set according to the determined downlink carrier set that corresponds to the reported CSI, where the reported CSI includes at least one CSI report, each CSI report of the at least one CSI report corresponds to one downlink carrier, and each downlink carrier in the downlink carrier set corresponds to one CSI report in the reported CSI.

It should be understood that the sequence numbers of the foregoing steps do not imply an execution sequence. The execution sequence of the steps should be determined according to functions and internal logic of the steps, which is not intended to limit the implementation process in the embodiment of the present invention in any way. For example, the base station may firstly perform S320 and then perform S310, and may also perform S310 and S320 concurrently.

Therefore, according to the method for transmitting channel state information in the embodiment of the present invention, channel state information from different downlink carriers can be transmitted on a same subframe, and a performance requirement on the transmission of channel state information can be ensured and power utilization efficiency can be improved by taking into consideration factors such as reporting types of and/or the number of channel state information reports that need to be transmitted on the same subframe, a capacity of a corresponding physical uplink channel, attributes of downlink carriers, priorities of physical uplink channel resources, and the number of coding bits.

In S310, the base station receives the channel state information CSI reported by the user equipment through a physical uplink channel, for example, a PUCCH. It should be understood that the embodiment of the present invention is described by only using the PUCCH as an example. However, the embodiment of the present invention is not limited thereto; for example, the physical uplink channel may also include a PUSCH or the like.

In S320, the base station, for example, may determine, according to various preset rules and with reference to information such as a reporting mode, a reporting period, a subframe offset, and a resource index of periodic CSI that are configured by the base station semi-statically through higher-layer signaling for a downlink carrier configured on the user equipment, the downlink carrier set that corresponds to the reported CSI. The following describes in detail how the base station determines the downlink carrier set, which may specifically be performed in one of the following manners:

Manner 1

In the embodiment of the present invention, optionally, reporting types of all CSI reports in the reported CSI all belong to a first CSI reporting type or a second CSI reporting type, where a performance requirement of the first CSI reporting type is higher than a performance requirement of the second CSI reporting type.

Optionally, the first CSI reporting type includes reporting type 3, reporting type 5, and reporting type 6; and the second CSI reporting type includes reporting type 2, reporting type 2b, reporting type 2c, reporting type 4, reporting type 1, reporting type 1a, and reporting type 2a. Alternatively, the first CSI reporting type includes reporting type 3, reporting type 5, reporting type 6, and reporting type 2a; and the second CSI reporting type includes reporting type 2, reporting type 2b, reporting type 2c, reporting type 4, reporting type 1, and reporting type 1a.

It should be understood that the foregoing classification of the reporting types is merely an exemplary solution in the embodiment of the present invention, and the embodiment of the present invention is not limited thereto. For example, the first CSI reporting type may include at least one reporting type among reporting type 3, reporting type 5, and reporting type 6; and the second CSI reporting type may include at least one reporting type among reporting type 2, reporting type 2b, reporting type 2c, reporting type 4, reporting type 1, reporting type 1a, and reporting type 2a.

It should also be understood that the embodiment of the present invention only takes classifying the reporting types into two categories as an example for description. However, the embodiment of the present invention is not limited thereto. The reporting types may also be classified into more categories in the embodiment of the present invention. In this case, reporting types of all CSI reports in the reported CSI all belong to a first CSI reporting type, a second CSI reporting type, or a third CSI reporting type, where a performance requirement of the first CSI reporting type is higher than a performance requirement of the second CSI reporting type, and the performance requirement of the second CSI reporting type is higher than a performance requirement of the third CSI reporting type.

For example, the reporting types of the CSI reports may be classified into three categories, where the first CSI reporting type includes reporting type 3, reporting type 5, and reporting type 6; the second CSI reporting type includes reporting type 2, reporting type 2b, reporting type 2c, and reporting type 4; and the third CSI reporting type includes reporting type 1, reporting type 1a, and reporting type 2a. Alternatively, the first CSI reporting type includes reporting type 3, reporting type 5, reporting type 6, and reporting type 2a; the second CSI reporting type includes reporting type 2, reporting type 2b, reporting type 2c, and reporting type 4; and the third CSI reporting type includes reporting type 1 and reporting type 1a.

In this manner of the embodiment of the present invention, the base station may determine, according to the reporting types of channel state information reports that need to be transmitted by the user equipment on a same subframe and/or a capacity of the corresponding physical uplink channel, the downlink carrier set that corresponds to the reported CSI.

Optionally, the determining, by the base station, the downlink carrier set that corresponds to the reported CSI includes:

when the user equipment needs to report at least one first CSI report and at least one second CSI report on the same subframe, determining a set, which is formed by downlink carriers that correspond to a part or all of first CSI reports among the at least one first CSI report, as the downlink carrier set, where a reporting type of the first CSI report belongs to the first CSI reporting type, and a reporting type of the second CSI report belongs to the second CSI reporting type.

Optionally, the determining a set, which is formed by downlink carriers that correspond to a part or all of first CSI reports among the at least one first CSI report, as the downlink carrier set includes:

when the total number of information bits of the at least one first CSI report is less than or equal to the capacity of the physical uplink channel, determining a set, which is formed by downlink carriers that correspond to all the first CSI reports among the at least one first CSI report, as the downlink carrier set; and when the total number of the information bits of the at least one first CSI report is greater than the capacity of the physical uplink channel, sequencing, according to attributes of downlink carriers that correspond to all the first CSI reports among the at least one first CSI report, the downlink carriers that correspond to all the first CSI reports, and determining a set, which is formed by M downlink carriers that rank the top among the sequenced downlink carriers, as the downlink carrier set, where the total number of information bits of first CSI reports that correspond to the M downlink carriers is less than or equal to the capacity of the physical uplink channel, and M is a natural number. In other words, when the total number of the information bits of the at least one first CSI report is greater than the capacity of the physical uplink channel, the determining a set, which is formed by downlink carriers that correspond to a part of first CSI reports among the at least one first CSI report, as the downlink carrier set specifically includes: sequencing, according to attributes of downlink carriers that correspond to all first CSI reports among the at least one first CSI report, the downlink carriers that correspond to all the first CSI reports, and determining a set, which is formed by M downlink carriers that rank the top among the sequenced downlink carriers, as the downlink carrier set, where the total number of information bits of first CSI reports that correspond to the M downlink carriers is less than or equal to the capacity of the physical uplink channel, and M is a natural number.

Preferably, the total number of information bits of the M first CSI reports is less than or equal to the capacity of the physical uplink channel, and the total number of information bits of M+1 first CSI reports that rank the top is greater than the capacity of the physical uplink channel. Preferably, the at least one first CSI report is sequenced in ascending order of downlink carrier indexes of downlink carriers. It should be understood that the at least one first CSI report may also be sequenced in descending order of downlink carrier indexes of downlink carriers or in ascending or descending order of other attributes of the downlink carriers.

For other details, refer to manner 1 in step S110. No further details are provided herein.

When the user equipment performs step S110 in manner 1 in step S110, this step is preferably performed in this manner.

Manner 2

In the embodiment of the present invention, the base station may determine, according to the total number of information bits of channel state information reports that the user equipment needs to transmit on a same subframe, a capacity of the physical uplink channel, and/or priorities of reporting types, the downlink carrier set that corresponds to the reported CSI.

Optionally, the determining, by the base station, the downlink carrier set that corresponds to the CSI reported by the user equipment includes:

when the total number of information bits of at least one CSI report to be reported that needs to be reported on the same subframe is less than or equal to the capacity of the physical uplink channel, determining a set, which is formed by downlink carriers that correspond to all CSI reports among the at least one CSI report to be reported, as the downlink carrier set; and when the total number of information bits of the at least one CSI report to be reported that needs to be reported on the same subframe is greater than the capacity of the physical uplink channel, determining a set, which is formed by downlink carriers that correspond to a part of CSI reports among the at least one CSI report to be reported, as the downlink carrier set, where the determining a set, which is formed by downlink carriers that correspond to a part of CSI reports among the at least one CSI report to be reported, as the downlink carrier set may include: sequencing, according to priorities of reporting types of all CSI reports to be reported among the at least one CSI report to be reported and/or attributes of corresponding downlink carriers, the at least one CSI report to be reported; and determining a set, which is formed by downlink carriers corresponding to M CSI reports to be reported that rank the top among the sequenced at least one CSI report to be reported, as the downlink carrier set, where the total number of information bits of the M CSI reports to be reported is less than or equal to the capacity of the physical uplink channel, and M is a natural number.

Optionally, priorities of reporting types of CSI reports include a first priority, a second priority, and a third priority, where a reporting type with the first priority includes reporting type 3, reporting type 5, reporting type 6, and reporting type 2a; a reporting type with the second priority includes reporting type 2, reporting type 2b, reporting type 2c, and reporting type 4; and a reporting type with the third priority includes reporting type 1 and reporting type 1a.

It should be understood that the foregoing classification of the priorities of the reporting types is merely an exemplary solution in the embodiment of the present invention, and the embodiment of the present invention is not limited thereto. For example, the priorities of the reporting types of the CSI reports may also include the first priority and the second priority, where the reporting type with the first priority includes a first CSI reporting type, and the reporting type with the second priority includes a second CSI reporting type.

When the user equipment performs step S110 in manner 2 in step S110, this step is preferably performed in this manner.

Manner 3

In the embodiment of the present invention, the base station may determine, according to the number of channel state information reports that need to be transmitted on a same subframe and/or priorities of reporting types, the downlink carrier set that corresponds to the reported CSI.

Optionally, the determining, by the base station, the downlink carrier set that corresponds to the CSI reported by the user equipment includes:

when the number of at least one CSI report to be reported that needs to be reported by the user equipment on the same subframe is less than or equal to a first value, determining a set, which is formed by downlink carriers that correspond to all CSI reports among the at least one CSI report to be reported, as the downlink carrier set, where the first value is greater than or equal to 2; and when the number of the at least one CSI report to be reported is greater than the first value, sequencing, in descending order of priorities of reporting types of all CSI reports among the at least one CSI report to be reported and/or in ascending order of carrier indexes of downlink carriers that correspond to all CSI reports among the at least one CSI report to be reported, the downlink carriers that correspond to all the CSI reports; and determining a set, which is formed by M downlink carriers that rank the top among the sequenced downlink carriers, as the downlink carrier set, where M is a natural number and is equal to the first value. The first value is preferably 2 in the present invention.

When the user equipment performs step S110 in manner 3 in step S110, this step is preferably performed in this manner.

Manner 4

In the embodiment of the present invention, the base station may determine, according to priorities of physical uplink channel resources that correspond to channel state information reports that need to be transmitted on a same subframe, the downlink carrier set that corresponds to the reported CSI.

Optionally, the determining, by the base station, the downlink carrier set that corresponds to the CSI reported by the user equipment includes:

when at least one CSI report to be reported that needs to be reported by the user equipment on the same subframe corresponds to a same physical uplink channel resource, determining a set, which is formed by downlink carriers that correspond to all CSI reports among the at least one CSI report to be reported, as the downlink carrier set; and when the at least one CSI report to be reported that needs to be reported by the user equipment on the same subframe corresponds to at least two physical uplink channel resources, determining a set, which is formed by downlink carriers that correspond to a part of CSI reports among the at least one CSI report to be reported, as the downlink carrier set, where the part of the CSI reports corresponds to a physical uplink channel resource with the highest priority among the at least two physical uplink channel resources.

Preferably, a set, which is formed by downlink carriers that correspond to all CSI reports corresponding to the physical uplink channel resource with the highest priority, is determined as the downlink carrier set. Preferably, among the at least two physical uplink channel resources, the physical uplink channel resource with the highest priority is a physical uplink channel resource corresponding to a CSI report of a reporting type that has the highest priority, or a physical uplink channel resource corresponding to a CSI report of a downlink carrier that has the minimum carrier index.

For other information about this manner, refer to manner 4 in step S110. No further details are provided herein.

In S330, the base station determines the CSI report of each downlink carrier in the downlink carrier set.

Optionally, as shown in FIG. 4, the determining, by the base station, the CSI report of each downlink carrier in the downlink carrier set includes:

S410. The base station performs decoding on CSI reports in the reported CSI that is received, so as to obtain decoded CSI information bits.

In this step, the base station may perform the decoding in one of the following manners:

Manner 1: The base station performs joint decoding on the CSI reports in the reported CSI that is received.

When the total number of information bits of channel state information reports that are from X downlink carriers and need to be reported by the user equipment on the same subframe is less than or equal to 11 bits, the Reed-Muller RM (Reed-Muller) (32, O) code is used for decoding; and when the total number of information bits of the channel state information reports of the X downlink carriers is greater than 11 bits, dual Reed-Muller RM (Reed-Muller) (32, O) codes are used for decoding. Alternatively, when the user equipment uses TBCC code for coding, the TBCC code is used for decoding in this step.

In this step, when the user equipment performs step S230 in manner 1 in step S230, decoding is preferably performed in this manner (manner 1) in this step.

Manner 2: The base station performs separate decoding on the CSI reports in the reported CSI that is received.

The performing, by the base station, decoding on the CSI reports in the reported CSI that is received includes: performing decoding on at least one first CSI report and at least one second CSI report that are included in the reported CSI, so as to obtain the decoded CSI information bits, where a reporting type of the first CSI report belongs to a first CSI reporting type, a reporting type of the second CSI report belongs to a second CSI reporting type, and a performance requirement of the first CSI reporting type is higher than a performance requirement of the second CSI reporting type.

Optionally, the performing, by the base station, decoding on at least one first CSI report and at least one second CSI report that are included in the reported CSI includes:

allocating a first coding bit number and a second coding bit number to the at least one first CSI report and the at least one second CSI report, respectively, where the first coding bit number is greater than the second coding bit number; and performing decoding on the at least one first CSI report and the at least one second CSI report according to the first coding bit number and the second coding bit number, respectively.

In this step, when the user equipment performs step S230 in manner 2 in step S230, decoding is preferably performed in this manner (manner 2) in this step.

S420. The base station determines the CSI report of each downlink carrier in the downlink carrier set according to the decoded CSI information bits and the downlink carrier set.

In S420, after the base station performs decoding on the received CSI reported by the user equipment, when determining the downlink carrier set that corresponds to the reported CSI, the base station may determine the CSI report of each downlink carrier in the downlink carrier set according to a preset sequencing rule.

Specifically, the base station may determine the CSI report of each downlink carrier in the downlink carrier set in one of the following manners:

Manner 1

Determine the CSI report of each downlink carrier in the downlink carrier set in ascending order of priorities of reporting types of CSI reports that correspond to downlink carriers in the downlink carrier set; and when priorities of reporting types of CSI reports that correspond to a part of downlink carriers in the downlink carrier set are the same, determine the CSI reports of the part of the downlink carriers in descending order of carrier indexes of the part of the downlink carriers.

In this step, when the user equipment performs step S220 in manner 1 in step S220, the CSI report of each downlink carrier in the downlink carrier set is preferably determined in this manner (manner 1) in this step.

Manner 2

Determine the CSI report of each downlink carrier in the downlink carrier set in ascending or descending order of attributes of downlink carriers that correspond to the CSI reports, where an attribute of a downlink carrier includes a downlink carrier index. The CSI report of each downlink carrier in the downlink carrier set is preferably determined in descending order of carrier indexes of the downlink carriers that correspond to the CSI reports in the present invention.

In this step, when the user equipment performs step S220 in manner 1 in step S220, the CSI report of each downlink carrier in the downlink carrier set is preferably determined in this manner (manner 2) in this step.

It should be understood that, for the purpose of convenient and brief description, for the detailed procedure of the method described above from the perspective of the base station, reference may be made to the corresponding procedure in the method embodiment described above from the perspective of the user equipment, and no further details are provided herein.

Therefore, according to the method for transmitting channel state information in the embodiment of the present invention, channel state information from different downlink carriers can be transmitted on a same subframe, and a performance requirement on the transmission of channel state information can be ensured and power utilization efficiency can be improved by taking into consideration factors such as reporting types of and/or the number of channel state information reports that need to be transmitted on the same subframe, a capacity of a corresponding physical uplink channel, attributes of downlink carriers, priorities of physical uplink channel resources, and the number of coding bits.

The foregoing describes in detail the method for transmitting channel state information according to the embodiments of the present invention with reference to FIG. 1 to FIG. 4. The following describes in detail a user equipment and a base station according to embodiments of the present invention with reference to FIG. 5 to FIG. 8.

Figure 5:
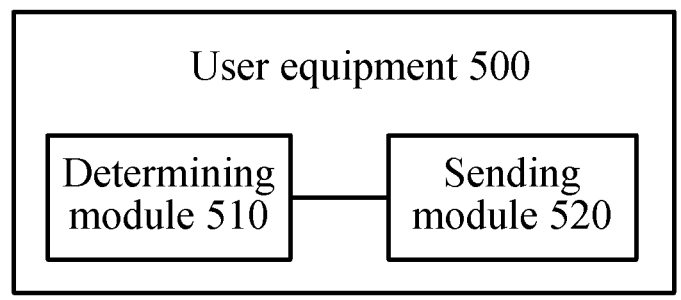
FIG. 5 is a schematic block diagram of a user equipment according to an embodiment of the present invention.

FIG. 5 shows a schematic block diagram of a user equipment according to an embodiment of the present invention. As shown in FIG. 5, the user equipment 500 includes:

a determining module 510, configured to determine to-be-reported channel state information CSI, where the to-be-reported CSI includes at least one CSI report, and each CSI report of the at least one CSI report corresponds to one downlink carrier; and a sending module 520, configured to send the to-be-reported CSI determined by the determining module 510 to the base station through a physical uplink channel.

According to the user equipment in the embodiment of the present invention, channel state information from different downlink carriers can be transmitted on a same subframe, and a performance requirement on the transmission of channel state information can be ensured and power utilization efficiency can be improved by taking into consideration factors such as reporting types of and/or the number of channel state information reports that need to be transmitted on the same subframe, a capacity of a corresponding physical uplink channel, attributes of downlink carriers, priorities of physical uplink channel resources, and the number of coding bits.

In the embodiment of the present invention, optionally, reporting types of all CSI reports in the to-be-reported CSI that is determined by the determining module 510 all belong to a first CSI reporting type or a second CSI reporting type, where a performance requirement of the first CSI reporting type is higher than a performance requirement of the second CSI reporting type.

Optionally, the determining module 510 is further configured to:

when at least one first CSI report and at least one second CSI report need to be reported on the same subframe, determine a part or all of first CSI reports among the at least one first CSI report as the to-be-reported CSI, where a reporting type of the first CSI report belongs to the first CSI reporting type, and a reporting type of the second CSI report belongs to the second CSI reporting type.

Optionally, the determining module 510 is specifically configured to:

when at least one first CSI report and at least one second CSI report need to be reported on the same subframe, and the total number of information bits of the at least one first CSI report is less than or equal to the capacity of the physical uplink channel, determine all first CSI reports among the at least one first CSI report as the to-be-reported CSI; and when the total number of the information bits of the at least one first CSI report is greater than the capacity of the physical uplink channel, sequence the at least one first CSI report according to attributes of downlink carriers that correspond to all first CSI reports among the at least one first CSI report, and determine, among the sequenced at least one first CSI report, M first CSI reports that rank the top as the to-be-reported CSI, where the total number of information bits of the M first CSI reports is less than or equal to the capacity of the physical uplink channel, and M is a natural number.

Optionally, the determining module 510 is further configured to:

when the number of at least one CSI report to be reported that needs to be reported on the same subframe is less than or equal to a first value, determine all CSI reports among the at least one CSI report to be reported as the to-be-reported CSI, where the first value is greater than or equal to 2; and when the number of the at least one CSI report to be reported is greater than the first value, sequence, in descending order of priorities of reporting types of all CSI reports among the at least one CSI report to be reported and/or in ascending order of carrier indexes of downlink carriers that correspond to all CSI reports among the at least one CSI report to be reported, the at least one CSI report to be reported; and determine, among the sequenced at least one CSI report to be reported, M CSI reports that rank the top as the to-be-reported CSI, where M is a natural number and is equal to the first value.

Optionally, the determining module 510 is further configured to:

when at least one CSI report to be reported that needs to be reported on the same subframe corresponds to a same physical uplink channel resource, determine all CSI reports among the at least one CSI report to be reported as the to-be-reported CSI; and when the at least one CSI report to be reported that needs to be reported on the same subframe corresponds to at least two physical uplink channel resources, determine, among the at least one CSI report to be reported, a part or all of CSI reports corresponding to a physical uplink channel resource with the highest priority as the to-be-reported CSI.

Optionally, among the at least two physical uplink channel resources, the physical uplink channel resource with the highest priority is a physical uplink channel resource corresponding to a CSI report of a reporting type that has the highest priority, or a physical uplink channel resource corresponding to a CSI report of a downlink carrier that has the minimum carrier index.

Figure 6:
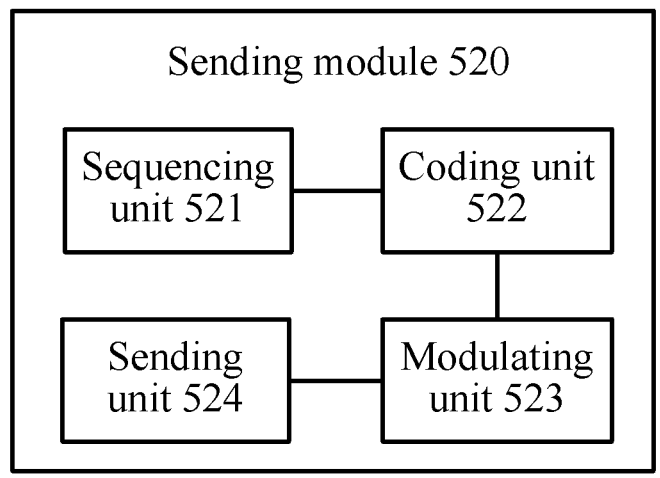
FIG. 6 is a schematic block diagram of a user equipment according to another embodiment of the present invention.

Optionally, as shown in FIG. 6, the sending module 520 in the embodiment of the present invention includes:

a coding unit 522, configured to perform channel coding on CSI reports in the to-be-reported CSI that is determined by the determining module 510, so as to obtain CSI coding information;

a modulating unit 523, configured to perform modulation on the CSI coding information obtained by the coding unit 522, so as to obtain a CSI modulation symbol; and a sending unit 524, configured to map the CSI modulation symbol obtained by the modulating unit 523 onto the physical uplink channel and send it to the base station.

Optionally, as shown in FIG. 6, the sending module 520 further includes:

a sequencing unit 521, configured to sequence the CSI reports in the to-be-reported CSI that is determined by the determining module 510, so as to obtain a CSI information bit sequence; and the coding unit 522 is further configured to perform channel coding on the CSI information bit sequence obtained by the sequencing unit 521, so as to obtain the CSI coding information.

Optionally, the sequencing unit 521 is further configured to:

sequence, in ascending order of priorities of reporting types of the CSI reports, the CSI reports in the to-be-reported CSI that is determined by the determining module 510, and when priorities of reporting types of a part of CSI reports in the to-be-reported CSI are the same, sequence the part of the CSI reports in descending order of carrier indexes of downlink carriers that correspond to all CSI reports among the part of the CSI reports.

Optionally, the coding unit 522 is further configured to:

perform channel coding on at least one first CSI report and at least one second CSI report that are included in the to-be-reported CSI determined by the determining module 510, so as to obtain the CSI coding information, where a reporting type of the first CSI report belongs to the first CSI reporting type, a reporting type of the second CSI report belongs to the second CSI reporting type, and the performance requirement of the first CSI reporting type is higher than the performance requirement of the second CSI reporting type.

Optionally, the coding unit 522 is specifically configured to:

allocate a first coding bit number and a second coding bit number to the at least one first CSI report and the at least one second CSI report, respectively, where the first coding bit number is greater than the second coding bit number; and perform channel coding on the at least one first CSI report and the at least one second CSI report according to the first coding bit number and the second coding bit number, respectively.

Optionally, the first CSI reporting type includes reporting type 3, reporting type 5, and reporting type 6; and the second CSI reporting type includes reporting type 2, reporting type 2b, reporting type 2c, reporting type 4, reporting type 1, reporting type 1a, and reporting type 2a. Alternatively, the first CSI reporting type includes reporting type 3, reporting type 5, reporting type 6, and reporting type 2a; and the second CSI reporting type includes reporting type 2, reporting type 2b, reporting type 2c, reporting type 4, reporting type 1, and reporting type 1a.

It should be understood that the foregoing classification of the reporting types is merely an exemplary solution in the embodiment of the present invention, and the embodiment of the present invention is not limited thereto. For example, the first CSI reporting type may include at least one reporting type among reporting type 3, reporting type 5, and reporting type 6; and the second CSI reporting type may include at least one reporting type among reporting type 2, reporting type 2b, reporting type 2c, reporting type 4, reporting type 1, reporting type 1a, and reporting type 2a.

It should be understood also that the embodiment of the present invention only takes classifying the reporting types into two categories as an example for description. However, the embodiment of the present invention is not limited thereto. The reporting types may also be classified into more categories in the embodiment of the present invention. In this case, reporting types of all CSI reports in the to-be-reported CSI all belong to a first CSI reporting type, a second CSI reporting type, or a third CSI reporting type, where a performance requirement of the first CSI reporting type is higher than a performance requirement of the second CSI reporting type, and the performance requirement of the second CSI reporting type is higher than a performance requirement of the third CSI reporting type.

For example, the reporting types of the CSI reports may be classified into three categories, where the first CSI reporting type includes reporting type 3, reporting type 5, and reporting type 6; the second CSI reporting type includes reporting type 2, reporting type 2b, reporting type 2c, and reporting type 4; and the third CSI reporting type includes reporting type 1, reporting type 1a, and reporting type 2a. Alternatively, the first CSI reporting type includes reporting type 3, reporting type 5, reporting type 6, and reporting type 2a; the second CSI reporting type includes reporting type 2, reporting type 2b, reporting type 2c, and reporting type 4; and the third CSI reporting type includes reporting type 1 and reporting type 1a.

Optionally, priorities of reporting types of CSI reports include a first priority, a second priority, and a third priority, where a reporting type with the first priority includes reporting type 3, reporting type 5, reporting type 6, and reporting type 2a; a reporting type with the second priority includes reporting type 2, reporting type 2b, reporting type 2c, and reporting type 4; and a reporting type with the third priority includes reporting type 1 and reporting type 1a.

It should be understood that the foregoing classification of the priorities of the reporting types is merely an exemplary solution in the embodiment of the present invention, and the embodiment of the present invention is not limited thereto. For example, the priorities of the reporting types of the CSI reports may also include the first priority and the second priority, where the reporting type with the first priority includes a first CSI reporting type, and the reporting type with the second priority includes a second CSI reporting type.

The user equipment 500 according to the embodiment of the present invention may correspond to the user equipment in the method for transmitting channel state information in the embodiments of the present invention, the foregoing and other operations and/or functions of each module on the user equipment 500 aim to implement corresponding procedures of the methods in FIG. 1 and FIG. 2, and for brevity, no further details are provided herein.

According to the user equipment for transmitting channel state information in the embodiment of the present invention, channel state information from different downlink carriers can be transmitted on a same subframe, and a performance requirement on the transmission of channel state information can be ensured and power utilization efficiency can be improved by taking into consideration factors such as reporting types of and/or the number of channel state information reports that need to be transmitted on the same subframe, a capacity of a corresponding physical uplink channel, attributes of downlink carriers, priorities of physical uplink channel resources, and the number of coding bits.

Figure 7:
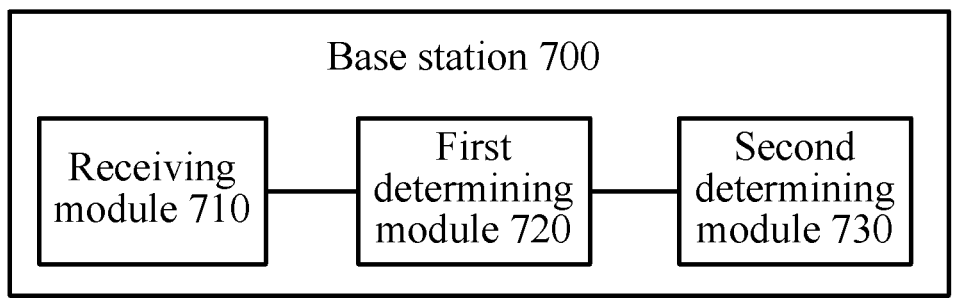
FIG. 7 is a schematic block diagram of a base station according to an embodiment of the present invention.

FIG. 7 shows a schematic block diagram of a base station according to an embodiment of the present invention. As shown in FIG. 7, the base station 700 includes:

a receiving module 710, configured to receive channel state information CSI that is reported by a user equipment through a physical uplink channel, where the reported CSI includes at least one CSI report, and each CSI report of the at least one CSI report corresponds to one downlink carrier;

a first determining module 720, configured to determine a downlink carrier set that corresponds to the reported CSI, where each downlink carrier in the downlink carrier set corresponds to one CSI report in the reported CSI; and a second determining module 730, configured to determine a CSI report of each downlink carrier in the downlink carrier set according to the reported CSI received by the receiving module 710 and the downlink carrier set determined by the first determining module 720.

According to the base station in the embodiment of the present invention, channel state information from different downlink carriers can be transmitted on a same subframe, and a performance requirement on the transmission of channel state information can be ensured and power utilization efficiency can be improved by taking into consideration factors such as reporting types of and/or the number of channel state information reports that need to be transmitted on the same subframe, a capacity of a corresponding physical uplink channel, attributes of downlink carriers, priorities of physical uplink channel resources, and the number of coding bits.

In the embodiment of the present invention, optionally, reporting types of all CSI reports in the reported CSI that is received by the receiving module 710 all belong to a first CSI reporting type or a second CSI reporting type, where a performance requirement of the first CSI reporting type is higher than a performance requirement of the second CSI reporting type.

Optionally, the first determining module 720 is further configured to:

when the user equipment needs to report at least one first CSI report and at least one second CSI report on the same subframe, determine a set, which is formed by downlink carriers that correspond to a part or all of first CSI reports among the at least one first CSI report, as the downlink carrier set, where a reporting type of the first CSI report belongs to the first CSI reporting type, and a reporting type of the second CSI report belongs to the second CSI reporting type.

Optionally, the first determining module 720 is specifically configured to:

when the user equipment needs to report at least one first CSI report and at least one second CSI report on the same subframe, and the total number of information bits of the at least one first CSI report is less than or equal to the capacity of the physical uplink channel, determine a set, which is formed by downlink carriers that correspond to all the first CSI reports among the at least one first CSI report, as the downlink carrier set; and when the total number of the information bits of the at least one first CSI report is greater than the capacity of the physical uplink channel, sequence, according to attributes of downlink carriers that correspond to all the first CSI reports among the at least one first CSI report, the downlink carriers that correspond to all the first CSI reports, and determine a set, which is formed by M downlink carriers that rank the top among the sequenced downlink carriers, as the downlink carrier set, where the total number of information bits of first CSI reports that correspond to the M downlink carriers is less than or equal to the capacity of the physical uplink channel, and M is a natural number.

Optionally, the first determining module 720 is further configured to:

when the number of at least one CSI report to be reported that needs to be reported by the user equipment on the same subframe is less than or equal to a first value, determine a set, which is formed by downlink carriers that correspond to all CSI reports among the at least one CSI report to be reported, as the downlink carrier set, where the first value is greater than or equal to 2; and when the number of the at least one CSI report to be reported is greater than the first value, sequence, in descending order of priorities of reporting types of all CSI reports among the at least one CSI report to be reported and/or in ascending order of carrier indexes of downlink carriers that correspond to all CSI reports among the at least one CSI report to be reported, downlink carriers that correspond to all the CSI reports; and determine a set, which is formed by M downlink carriers that rank the top among the sequenced downlink carriers, as the downlink carrier set, where M is a natural number and is equal to the first value.

Optionally, the first determining module 720 is further configured to:

when at least one CSI report to be reported that needs to be reported by the user equipment on the same subframe corresponds to a same physical uplink channel resource, determine a set, which is formed by downlink carriers that correspond to all CSI reports among the at least one CSI report to be reported, as the downlink carrier set; and when the at least one CSI report to be reported that needs to be reported by the user equipment on the same subframe corresponds to at least two physical uplink channel resources, determine a set, which is formed by downlink carriers that correspond to a part of CSI reports among the at least one CSI report to be reported, as the downlink carrier set, where the part of the CSI reports corresponds to a physical uplink channel resource with the highest priority among the at least two physical uplink channel resources.

Optionally, among the at least two physical uplink channel resources, the physical uplink channel resource with the highest priority is a physical uplink channel resource corresponding to a CSI report of a reporting type that has the highest priority, or a physical uplink channel resource corresponding to a CSI report of a downlink carrier that has the minimum carrier index.

Optionally, the second determining module 730 is further configured to:

determine the CSI report of each downlink carrier in the downlink carrier set in ascending order of priorities of reporting types of CSI reports that correspond to downlink carriers in the downlink carrier set determined by the first determining module 720; and when priorities of reporting types of CSI reports that correspond to a part of downlink carriers in the downlink carrier set are the same, determine the CSI reports of the part of the downlink carriers in descending order of carrier indexes of the part of the downlink carriers.

Figure 8:
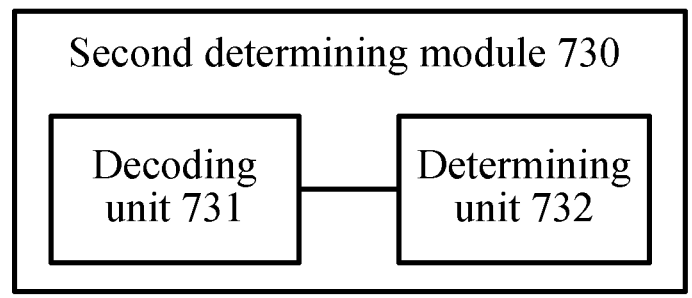
FIG. 8 is a schematic block diagram of a base station according to another embodiment of the present invention.

Optionally, as shown in FIG. 8, the second determining module 730 includes:

a decoding unit 731, configured to perform decoding on CSI reports in the reported CSI that is received by the receiving module 710, so as to obtain decoded CSI information bits; and a determining unit 732, configured to determine the CSI report of each downlink carrier in the downlink carrier set according to the decoded CSI information bits obtained by the decoding unit 731 and the downlink carrier set.

Optionally, the decoding unit 731 is further configured to:

perform decoding on at least one first CSI report and at least one second CSI report that are included in the reported CSI received by the receiving module 710, so as to obtain the decoded CSI information bits, where a reporting type of the first CSI report belongs to the first CSI reporting type, a reporting type of the second CSI report belongs to the second CSI reporting type, and the performance requirement of the first CSI reporting type is higher than the performance requirement of the second CSI reporting type.

Optionally, the decoding unit 731 is specifically configured to:

allocate a first coding bit number and a second coding bit number to the at least one first CSI report and the at least one second CSI report, respectively, where the first coding bit number is greater than the second coding bit number; and perform decoding on the at least one first CSI report and the at least one second CSI report according to the first coding bit number and the second coding bit number, respectively.

Optionally, the first CSI reporting type includes reporting type 3, reporting type 5, and reporting type 6; and the second CSI reporting type includes reporting type 2, reporting type 2b, reporting type 2c, reporting type 4, reporting type 1, reporting type 1a, and reporting type 2a. Alternatively, the first CSI reporting type includes reporting type 3, reporting type 5, reporting type 6, and reporting type 2a; and the second CSI reporting type includes reporting type 2, reporting type 2b, reporting type 2c, reporting type 4, reporting type 1, and reporting type 1a.

It should be understood that the foregoing classification of the reporting types is merely an exemplary solution in the embodiment of the present invention, and the embodiment of the present invention is not limited thereto. For example, the first CSI reporting type may include at least one reporting type among reporting type 3, reporting type 5, and reporting type 6; and the second CSI reporting type may include at least one reporting type among reporting type 2, reporting type 2b, reporting type 2c, reporting type 4, reporting type 1, reporting type 1a, and reporting type 2a.

It should also be understood that the embodiment of the present invention only takes classifying the reporting types into two categories as an example for description. However, the embodiment of the present invention is not limited thereto. The reporting types may also be classified into more categories in the embodiment of the present invention. In this case, reporting types of all CSI reports in the reported CSI all belong to a first CSI reporting type, a second CSI reporting type, or a third CSI reporting type, where a performance requirement of the first CSI reporting type is higher than a performance requirement of the second CSI reporting type, and the performance requirement of the second CSI reporting type is higher than a performance requirement of the third CSI reporting type.

For example, the reporting types of the CSI reports may be classified into three categories, where the first CSI reporting type includes reporting type 3, reporting type 5, and reporting type 6; the second CSI reporting type includes reporting type 2, reporting type 2b, reporting type 2c, and reporting type 4; and the third CSI reporting type includes reporting type 1, reporting type 1a, and reporting type 2a. Alternatively, the first CSI reporting type includes reporting type 3, reporting type 5, reporting type 6, and reporting type 2a; the second CSI reporting type includes reporting type 2, reporting type 2b, reporting type 2c, and reporting type 4; and the third CSI reporting type includes reporting type 1 and reporting type 1a.

Optionally, priorities of reporting types of CSI reports include a first priority, a second priority, and a third priority, where a reporting type with the first priority includes reporting type 3, reporting type 5, reporting type 6, and reporting type 2a; a reporting type with the second priority includes reporting type 2, reporting type 2b, reporting type 2c, and reporting type 4; and a reporting type with the third priority includes reporting type 1 and reporting type 1a.

It should be understood that the foregoing classification of the priorities of the reporting types is merely an exemplary solution in the embodiment of the present invention, and the embodiment of the present invention is not limited thereto. For example, the priorities of the reporting types of the CSI reports may also include the first priority and the second priority, where the reporting type with the first priority includes a first CSI reporting type, and the reporting type with the second priority includes a second CSI reporting type.

The base station 700 according to the embodiment of the present invention may correspond to the base station in the method for transmitting channel state information in the embodiments of the present invention, the foregoing and other operations and/or functions of each module on the base station 700 aim to implement corresponding procedures of the methods in FIG. 3 and FIG. 4, and for brevity, no further details are provided herein.

According to the base station for transmitting channel state information in the embodiment of the present invention, channel state information from different downlink carriers can be transmitted on a same subframe, and a performance requirement on the transmission of channel state information can be ensured and power utilization efficiency can be improved by taking into consideration factors such as reporting types of and/or the number of channel state information reports that need to be transmitted on the same subframe, a capacity of a corresponding physical uplink channel, attributes of downlink carriers, priorities of physical uplink channel resources, and the number of coding bits.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on the particular applications and design constraint conditions of the technical solution. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiments are merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and the parts displayed as units may or may not be physical units, may be located in one position, or may be distributed on a plurality of network units. Some or all of the units may be selected to achieve the objective of the solution of the embodiment of the present invention according to actual needs.

In addition, functional units in the embodiments of the present invention may be integrated into one processing unit, or each of the units may exist alone physically, or two or more units may be integrated into one unit. The integrated units may be implemented in a form of hardware, or may be implemented in a form of a software functional unit.

When the integrated units are implemented in a form of a software functional unit and sold or used as an independent product, the integrated units may be stored in a computer-readable storage medium. Based on such an understanding, the technical solutions of the present invention essentially, or the part contributing to the prior art, or all or a part of the technical solutions may be implemented in a form of a software product. The computer software product is stored in a storage medium and includes several instructions for instructing a computer device (which may be a personal computer, a server, or a network device or the like) to perform all or a part of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific embodiments of the present invention, but are not intended to limit the protection scope of the present invention. Any equivalent modification or replacement readily figured out by a person skilled in the art within the technical scope of the present invention shall fall within the protection scope of the present invention. Therefore, the protection scope of the present invention shall be subject to the protection scope of the claims.

What is claimed is:

1. A method for transmitting channel state information, comprising:
   determining to-be-reported channel state information (CSI), which comprises a plurality of CSI reports from among all CSI reports that need to be reported on a same subframe; and
   sending the to-be-reported CSI to a base station through a physical uplink channel;
   wherein the determining to-be-reported CSI comprises:
   when a number of all CSI reports that need to be reported on the same subframe is less than or equal to a first value, determining all CSI reports as the to-be-reported CSI, wherein the first value is greater than or equal to 2; or
   when a number of all CSI reports is greater than a first value, sequencing, in descending order of priorities of reporting types of all CSI reports or in ascending order of carrier indexes of downlink carriers that correspond to all CSI reports; and determining, among the sequenced CSI reports, M CSI reports that rank first in the sequence as the to-be-reported CSI, wherein M is a natural number and is equal to the first value.

2. The method according to claim 1, wherein reporting types of all CSI reports in the to-be-reported CSI all belong to a first CSI reporting type or a second CSI reporting type, wherein a performance requirement of the first CSI reporting type is higher than a performance requirement of the second CSI reporting type.

3. A method, comprising:
   receiving channel state information (CSI) that is reported by a user equipment through a physical uplink channel, the reported CSI comprising a plurality of CSI reports from among all CSI reports that need to be reported on a same subframe;
   determining a downlink carrier set, wherein the downlink carrier set is formed by downlink carriers that correspond to the plurality of CSI reports, each downlink carrier in the downlink carrier set corresponds to one CSI report in the plurality of CSI reports; and
   determining a CSI report of each downlink carrier in the downlink carrier set according to the reported CSI and the downlink carrier set;
   wherein the determining the downlink carrier set comprises:
   when a number of at least one CSI report to be reported on the same subframe is less than or equal to a first value, determining a set, which is formed by downlink carriers that correspond to all CSI reports among the at least one CSI report to be reported, as the downlink carrier set, wherein the first value is greater than or equal to 2; or
   when a number of at least one CSI report to be reported on the same subframe is greater than a first value, sequencing, in descending order of priorities of reporting types of all CSI reports among the at least one CSI report to be reported or in ascending order of carrier indexes of downlink carriers that correspond to all CSI reports among the at least one CSI report to be reported, the downlink carriers that correspond to all the CSI reports; and determining a set, which is formed by M downlink carriers that rank the top among the sequenced downlink carriers, as the downlink carrier set, wherein M is a natural number and is equal to the first value.

4. The method according to claim 3, wherein reporting types of all CSI reports in the reported CSI all belong to a first CSI reporting type or a second CSI reporting type, wherein a performance requirement of the first CSI reporting type is higher than a performance requirement of the second CSI reporting type.

5. A user equipment, comprising:
   a computer device; and
   a non-transitory computer-readable storage medium coupled to the computer device and storing programming for execution by the computer device, wherein the programming, when executed by the computer device, configures the user equipment to:
   determine to-be-reported channel state information (CSI), which comprises a plurality of CSI reports from among all CSI reports that need to be reported on a same subframe; and
   send the to-be-reported CSI to a base station through a physical uplink channel;
   determining the to-be-reported CSI comprises:
   when a number of all CSI reports that need to be reported on the same subframe is less than or equal to a first value, determine all CSI reports as the to-be-reported CSI, wherein the first value is greater than or equal to 2; or
   when a number of all CSI reports that need to be reported on the same subframe is greater than a first value, sequence, in descending order of priorities of reporting types of all CSI reports or in ascending order of carrier indexes of downlink carriers that correspond to all CSI reports; and determine, among the sequenced CSI reports, M CSI reports that rank first in the sequence as the to-be-reported CSI, wherein M is a natural number and is equal to the first value.

6. The user equipment according to claim 5, wherein reporting types of all CSI reports in the to-be-reported CSI all belong to a first CSI reporting type or a second CSI reporting type, wherein a performance requirement of the first CSI reporting type is higher than a performance requirement of the second CSI reporting type.

7. A base station, comprising:

a computer device; and a non-transitory computer-readable storage medium coupled to the computer device and storing programming for execution by the computer device, wherein the programming, when executed by the computer device, configures the base station to:

receive channel state information (CSI) that is reported by a user equipment through a physical uplink channel, the reported CSI comprising a plurality of CSI reports from among all CSI reports that need to be reported on a same subframe;

determine a downlink carrier set, wherein the downlink carrier set is formed by downlink carriers that correspond to the plurality of CSI reports, each downlink carrier in the downlink carrier set corresponds to one CSI report in the plurality of CSI reports; and determine a CSI report of each downlink carrier in the downlink carrier set according to the reported CSI and the downlink carrier set;

wherein the determining the downlink carrier set comprises:

when a number of at least one CSI report to be reported on the same subframe is less than or equal to a first value, determining a set, which is formed by downlink carriers that correspond to all CSI reports among the at least one CSI report to be reported, as the downlink carrier set, wherein the first value is greater than or equal to 2; or when a number of at least one CSI report to be reported on the same subframe is greater than a first value, sequencing, in descending order of priorities of reporting types of all CSI reports among the at least one CSI report to be reported or in ascending order of carrier indexes of downlink carriers that correspond to all CSI reports among the at least one CSI report to be reported, the downlink carriers that correspond to all the CSI reports; and determining a set, which is formed by M downlink carriers that rank the top among the sequenced downlink carriers, as the downlink carrier set, wherein M is a natural number and is equal to the first value.

8. The base station according to claim 7, wherein reporting types of all CSI reports in the reported CSI all belong to a first CSI reporting type or a second CSI reporting type, wherein a performance requirement of the first CSI reporting type is higher than a performance requirement of the second CSI reporting type.

9. A system comprising:

a base station; and a user equipment, wherein:

the user equipment is configured to determine to-be-reported channel state information (CSI), which comprises a plurality of CSI reports from among all CSI reports that need to be reported on a same subframe; wherein when a number of all CSI reports that need to be reported on the same subframe is less than or equal to a first value, determine all CSI reports as the to-be-reported CSI, wherein the first value is greater than or equal to 2, or, wherein when a number of all CSI reports that need to be reported on the same subframe is greater than a first value, sequence, in descending order of priorities of reporting types of all CSI reports or in ascending order of carrier indexes of downlink carriers that correspond to all CSI reports, and determine, among the sequenced CSI reports, M CSI reports that rank first in the sequence as the to-be-reported CSI, wherein M is a natural number and is equal to the first value; wherein the user equipment is further configured to send the to-be-reported CSI to a base station through a physical uplink channel; and the base station is configured to receive the CSI that is reported by the user equipment through the physical uplink channel, the reported CSI comprising a reported plurality of CSI reports, determine a downlink carrier set, wherein the downlink carrier set is formed by downlink carriers that correspond to the plurality of CSI reports, each downlink carrier in the downlink carrier set corresponds to one CSI report in the plurality of CSI reports, wherein the base station is further configured to determine a CSI report of each downlink carrier in the downlink carrier set according to the reported CSI and the downlink carrier set.

\* \* \* \* \*